United States Patent
Guo et al.

(10) Patent No.: US 11,893,591 B2
(45) Date of Patent: Feb. 6, 2024

(54) E-CIGARETTE AND AUTHENTICATION SYSTEM AND AUTHENTICATION METHOD FOR E-CIGARETTE

(71) Applicant: Red Coral IP Holding Company, Inc., Newark, DE (US)

(72) Inventors: Xingchen Guo, Irvine, CA (US); Yong Fu, Shenzhen (CN)

(73) Assignee: Red Coral IP Holding Company, Inc., Middletown, DE (US)

( * ) Notice: Subject to any disclaimer, the term of this patent is extended or adjusted under 35 U.S.C. 154(b) by 414 days.

(21) Appl. No.: 17/347,425

(22) Filed: Jun. 14, 2021

(65) Prior Publication Data

US 2022/0398602 A1    Dec. 15, 2022

(51) Int. Cl.
| | | |
|---|---|---|
| *G06Q 30/018* | (2023.01) | |
| *A24F 40/65* | (2020.01) | |
| *A24F 15/06* | (2006.01) | |
| *G06F 21/36* | (2013.01) | |
| *G06F 21/33* | (2013.01) | |
| *G06F 21/32* | (2013.01) | |

(Continued)

(52) U.S. Cl.
CPC ......... *G06Q 30/0185* (2013.01); *A24F 15/06* (2013.01); *A24F 40/65* (2020.01); *G06F 21/32* (2013.01); *G06F 21/33* (2013.01); *G06F 21/36* (2013.01); *G06V 40/172* (2022.01); *H04L 9/0869* (2013.01); *H04W 4/80* (2018.02); *G06V 40/178* (2022.01)

(58) Field of Classification Search
CPC .................................................. G06Q 30/0185
See application file for complete search history.

(56) References Cited

U.S. PATENT DOCUMENTS 11,568,424 B2 *   1/2023   North ...................... H04W 4/35
2016/0296810 A1 * 10/2016   Mandel ................ H04B 5/0062
(Continued)

FOREIGN PATENT DOCUMENTS

| CN | 106327214 A | * | 1/2017 |
| CN | 109247623 | * | 10/2018 |

(Continued)

OTHER PUBLICATIONS

State intellectual property office of china releases shenzhen goldreams tech's patent application for anti-counterfeiting system of electronic cigarette and electronic cigarette using anti-counterfeiting system. (Apr. 12, 2020) (Year: 2020).*

*Primary Examiner* — Maria C Santos-Diaz
(74) *Attorney, Agent, or Firm* — WHGC, P.L.C.; Alexander R. Schlee

(57) ABSTRACT

An authentication system and authentication method for an electronic cigarette and an electronic cigarette configured to be connected within such system so that the authentication method can be applied to the electronic cigarette. The system can be divided into 3 main components, namely the electronic cigarette itself, a mobile terminal in communication with the electronic cigarette and reading a security label from the electronic cigarette, and a service terminal connected to the mobile terminal, for instance through the cloud. The system and method protects particularly from counterfeit cartridges and secures that a cartridge of the intended content is connected in the electronic cigarette. In addition, age verification can be performed.

11 Claims, 17 Drawing Sheets

(51) Int. Cl.
*H04W 4/80* (2018.01)
*H04L 9/08* (2006.01)
*G06V 40/16* (2022.01)

(56) References Cited

U.S. PATENT DOCUMENTS

| | | | |
|---|---|---|---|
| 2018/0271149 A1* | 9/2018 | Holtz | A24F 1/00 |
| 2019/0333072 A1* | 10/2019 | Villwock | G01N 1/02 |
| 2020/0085105 A1* | 3/2020 | Barbaric | A24F 40/70 |
| 2020/0093180 A1* | 3/2020 | Qiu | A24F 40/50 |
| 2020/0137570 A1* | 4/2020 | Skoda | H04L 63/0861 |
| 2021/0212379 A1* | 7/2021 | Naeckel | G06K 7/10366 |
| 2022/0400771 A1* | 12/2022 | Guo | A24F 40/65 |

FOREIGN PATENT DOCUMENTS

| | | | |
|---|---|---|---|
| WO | WO-2018172555 A1 * | 9/2018 | |
| WO | WO-2019232739 A1 * | 12/2019 | |
| WO | WO-2020096609 A1 * | 5/2020 | |
| WO | WO-2020117338 A1 * | 6/2020 | |
| WO | WO-2021086449 A1 * | 5/2021 | |

* cited by examiner

E-CIGARETTE AND AUTHENTICATION SYSTEM AND AUTHENTICATION METHOD FOR E-CIGARETTE

BACKGROUND OF THE INVENTION

1. Field of the Invention

The present application relates to the field of electronic cigarettes, and in particular, to an electronic cigarette anti-counterfeiting method, device, mobile terminal, service terminal, and storage medium.

2. Background Technology

The existing electronic cigarettes on the market generally do not have an anti-counterfeiting function, making them easy to plagiarize and causing fakes to appear in the market in large numbers. This causes a negative impact on both users and brand owners. In many cases, in part due to unclear or deceptive packaging labels, a user may unknowingly use an electronic cigarette containing unapproved and/or unsafe ingredients, in some cases causing serious consequences. Additionally, with the popularization of electronic cigarette culture, many underage consumers purchase electronic cigarettes for smoking via various channels, which has a serious impact on their physical and mental development. This is especially of concern for e-cigarettes, which are particularly popular among younger consumers for the discrete nature of such devices. However, systems and methods for secure authentication of electronic cigarettes has proven to be a challenge, in particular due to data security concerns. Therefore, there exists a need in the art to provide improved mechanisms and methods for securely authenticating the contents of e-cigarettes and more effective means for mitigating tobacco and other substance use by minors.

Some technical fields utilize token authentication to prevent spoofing attacks and other data breaches, using tokens as an alternative to passwords. Generally, an authentication token is created by a server associated with a random number or a pseudo-random number. These authentication tokens expire after a given period of time so as to improve level of security.

An authentication token contains login credentials corresponding to a specific user of a computer system, and generally comprises a specific code comprising random numbers. Such authentication is utilized to ensure safe transfer of data and other security information, and prevents third parties from intercepting or altering information. These also serve to securely streamline the authentication process by reducing the need to provide credentials, which is advantageous for quickly allowing the electronic cigarette to be unlocked by consumers. In particular, minimizing the burden on users to authenticate their product fosters more widespread acceptance of the technology, ultimately allowing for of age-verification and anti-counterfeit measures to be effectively implemented.

SUMMARY OF THE INVENTION

It is an object of the present invention to provide a streamlined system and method for secure anti-counterfeiting authentication of electronic cigarette and age-verification of consumers, resulting in more responsible and informed use of tobacco and other substances.

According to a first aspect of the invention, a system is provided for anti-counterfeit verification of electronic cigarettes, the system comprising: an electronic cigarette, comprising: an anti-counterfeiting label, comprising: a label index, including at least one piece of information about the electronic cigarette; and a unique label identification code, corresponding to the electronic cigarette; a label information module, comprising a sending module, configured to send anti-counterfeiting label information to a mobile terminal; a label key module, comprising a receiving module, an authentication module, and a sending module, configured to: receive an authentication request carrying a label key generated by a service terminal; authenticate the label key; and transmit a random number to the mobile terminal after successful label key authentication; a token module, comprising a sending module, a receiving module, and a generation module, configured to: receive and verify a first identity authentication token; and transmit a second identity authentication token to the mobile terminal for verification by the service terminal; and generate an activation signal upon successful authentication of the first and second identity authentication tokens; the mobile terminal, comprising: a sensor, comprising an acquiring module, configured to acquire anti-counterfeiting label information from the anti-counterfeiting label of an electronic cigarette located in an identification range; a label key module, comprising a sending module and a receiving module, configured to: transmit a key acquisition request carrying the label index and the unique label identification code of the electronic cigarette to the service terminal; receive the label key from the service terminal; transmit an authentication request carrying the label key to the electronic cigarette; and facilitate transmission of the random number from the electronic cigarette to the service terminal; a token module, comprising a generation module, a receiving module, a sending module, and a trigger module configured to: generate a first identity authentication token based on authentication data received from the service terminal; transmit a first identity authentication token to the electronic cigarette; facilitate transmission of second identity authentication token from the electronic cigarette to the service terminal; and trigger the electronic cigarette to generate an activation signal upon successful authentication of the first and second identity authentication tokens; and the service terminal, comprising: a label key module, comprising a receiving module and a sending module, configured to: receive a key acquisition request carrying a label index and a label unique identification code from the mobile terminal; and transmit a label key based on the key acquisition request to the mobile terminal for authentication by the electronic cigarette; an authentication data module, comprising a sending module and a receiving module, configured to: receive the random number from the mobile terminal; and transmit authentication data to the mobile terminal corresponding to the random number transmitted by the electronic cigarette, wherein the authentication data is used to generate a first identity authentication token; and a token module, comprising a receiving module and a verification module, configured to receive and verify the second identity authentication token sent from the mobile terminal; wherein, the electronic cigarette generates an activation signal upon successful authentication of the first and second identity authentication tokens.

According to a second aspect of the invention, a method of authenticating an electronic cigarette is provided, the method comprising: a mobile terminal acquiring anti-counterfeiting label information of an electronic cigarette located in an identification range, the electronic cigarette label information comprising a label index and a label unique identification code; the mobile terminal sending a key acquisition request carrying the label index and the label unique identification code to a service terminal; the service terminal sending a label key according to the label index and the label unique identification code to the mobile terminal; the mobile terminal sending an authentication request carrying the label key to the electronic cigarette; the electronic cigarette authenticating the label key and transmitting a random number to the mobile terminal after successful authentication; the mobile terminal sending the random number to the service terminal; the service terminal sending authentication data according to the random number to the mobile terminal; the mobile terminal generating a first identity authentication token according to the authentication data, for verification by the electronic cigarette; the electronic cigarette sending a second identity authentication token to the service terminal via the mobile terminal, for verification by the service terminal; and the electronic cigarette generating an activation signal upon successful authentication of the first and second identity authentication tokens.

According to a third aspect of the invention, an electronic cigarette is provided, comprising: a sending module, configured to send anti-counterfeiting label information comprising a label index and a label unique identification code to a mobile terminal when the mobile terminal is located within a sensing detection range, wherein the anti-counterfeiting label information is bundled with a key acquisition request by the mobile terminal to obtain a label key according to the label index and the label unique identification code from the service terminal; a receiving module, configured to receive an authentication request carrying the label key from the mobile terminal; an authentication module, configured to authenticate the label key and transmit a random number to the service terminal via the mobile terminal upon successful authentication, wherein the random number is used to obtain corresponding authentication data from the service terminal; wherein the receiving module is further configured to receive and verify a first identity authentication token sent by the mobile terminal, and wherein the sending module is further configured to send a second identity authentication token to the service terminal via the mobile terminal for verification; and a generation module, configured to generate an activation signal upon successful authentications of the first and second identity authentication tokens.

DETAILED DESCRIPTION OF THE INVENTION

In general, the invention comprises an electronic cigarette with a label, a mobile terminal and a service terminal, each configured to transmit and receive data and operable to execute functions related to authentication. This authentication data includes NFC anti-counterfeiting label information, label keys, random numbers, authentication data, and identity authentication tokens.

The purpose of embodiments of the present application is to provide an electronic cigarette anti-counterfeiting method and device to achieve the anti-counterfeiting function of an electronic cigarette. The first sending, receiving, and generation modules correspond to the mobile terminal. The second sending, receiving, and generation modules correspond to the electronic cigarette. The third sending and receiving modules correspond to the service terminal.

According to the invention, an electronic cigarette anti-counterfeiting method including a mobile terminal is provided, the method comprising: acquiring NFC anti-counterfeiting label information of an electronic cigarette located in an identification range, the electronic cigarette label information comprising a label index and a label unique identification code; sending a key acquisition request carrying the label index and the label unique identification code to a service terminal, so that the service terminal returns a label key according to the label index and the label unique identification code; sending an authentication request carrying the label key to the electronic cigarette, so that the electronic cigarette authenticates the label key and returns a random number after successful authentication; sending the random number to the service terminal, so that the service terminal returns authentication data according to the random number; generating a first identity authentication token according to the authentication data, for verification by the electronic cigarette; receiving a second identity authentication token sent by the electronic cigarette and sending the second identity authentication token to the service terminal, for verification by the service terminal; and triggering the electronic cigarette to generate an activation signal when authentication of the first and second identity authentication tokens are both passed.

Preferably, the aforementioned method further comprises sending NFC anti-counterfeiting label information to a mobile terminal when the mobile terminal is located within a sensing detection range, wherein the NFC anti-counterfeiting label information of the electronic cigarette comprises a label index and a label unique identification code; receiving an authentication request from the mobile terminal, the authentication request carrying the label key sent by the service terminal via the mobile terminal, wherein the label key sent to the electronic cigarette is obtained by the mobile terminal sending the service terminal a key acquisition request with the accompanying label information; authenticating the label key and transmitting a random number to the service terminal via the mobile terminal after the authentication is passed, wherein the random number is used to obtain corresponding authentication data from the service terminal; receiving and verifying the first identity authentication token sent by the mobile terminal; sending the second identity authentication token to the service terminal via the mobile terminal for verification; and generating an activation signal, upon successful authentications of the first and second identity authentication tokens.

Viewed from a service terminal perspective, the electronic cigarette anti-counterfeiting method may comprise receiving a key acquisition request carrying a label index and a label unique identification code from a mobile terminal; transmitting a label key according to the label index and the label unique identification code to the mobile terminal for the generation of an authentication request to be verified by the electronic cigarette; receiving the random number generated by the e-cigarette from the mobile terminal; transmitting authentication data according to the random number to the mobile terminal for generation of a first identity authentication token for verification by the electronic cigarette; receiving the second identity authentication token sent by the mobile terminal; and verifying the second identity authentication token, to trigger the electronic cigarette to generate an activation signal when the first and second identity authentication tokens are passed.

Viewed from a mobile terminal perspective of the e-cigarette-mobile terminal-service terminal system, such mobile terminal device may according to a preferred embodiment be equipped with an acquiring module, configured to acquire NFC anti-counterfeiting label information of an electronic cigarette with an NFC anti-counterfeiting label when the electronic cigarette is located in an identification range, wherein the NFC anti-counterfeiting label information of the electronic cigarette comprising a label index and a label unique identification code; a first sending module, configured to send a key acquisition request carrying the label index and the label unique identification code to a service terminal, so that the service terminal returns a label key according to the label index and the label unique identification code, wherein the first sending module is further configured to send an authentication request carrying a corresponding label key to the electronic cigarette for authentication of the label key, and wherein upon authentication, the first sending module is further configured to send a random number from the electronic cigarette to the service terminal via the mobile terminal for the retrieval of authentication data according to the random number; a first generation module, configured to generate a first identity authentication token according to the authentication data for verification by the electronic cigarette; a first receiving module, configured to facilitate transmission of a second identity authentication token from the electronic cigarette to the service terminal via the mobile terminal for verification; and a trigger module, configured to trigger the electronic cigarette to generate an activation signal when authentications of the first and second identity According to the invention, a system for anti-counterfeit verification of electronic cigarettes is provided, the system comprising: an electronic cigarette, comprising: an anti-counterfeiting label, comprising a label index, including at least one piece of information about the electronic cigarette; and a unique label identification code, corresponding to the electronic cigarette a label information module, comprising a sending module, configured to send anti-counterfeiting label information to a mobile terminal a label key module, comprising a receiving module, an authentication module, and a sending module, configured to: receive an authentication request carrying a label key generated by a service terminal; authenticate the label key; and transmit a random number to the mobile terminal after successful label key authentication; a token module, comprising a sending module, a receiving module, and a generation module, configured to: receive and verify a first identity authentication token; and transmit a second identity authentication token to the mobile terminal for verification by the service terminal; and generate an activation signal upon successful authentication of the first and second identity authentication tokens; the mobile terminal, comprising: a sensor, comprising an acquiring module, configured to acquire anti-counterfeiting label information from the anti-counterfeiting label of an electronic cigarette located in an identification range; a label key module, comprising a sending module and a receiving module, configured to: transmit a key acquisition request carrying the label index and the unique label identification code of the electronic cigarette to the service terminal; receive the label key from the service terminal; transmit an authentication request carrying the label key to the electronic cigarette; and facilitate transmission of the random number from the electronic cigarette to the service terminal; a token module, comprising a generation module, a receiving module, a sending module, and a trigger module configured to: generate a first identity authentication token based on authentication data received from the service terminal; transmit a first identity authentication token to the electronic cigarette; facilitate transmission of second identity authentication token from the electronic cigarette to the service terminal; and trigger the electronic cigarette to generate an activation signal upon successful authentication of the first and second identity authentication tokens; and the service terminal, comprising: a label key module, comprising a receiving module and a sending module, configured to: receive a key acquisition request carrying a label index and a label unique identification code from the mobile terminal; and transmit a label key based on the key acquisition request to the mobile terminal for authentication by the electronic cigarette; an authentication data module, comprising a sending module and a receiving module, configured to: receive the random number from the mobile terminal; and transmit authentication data to the mobile terminal corresponding to the random number transmitted by the electronic cigarette, wherein the authentication data is used to generate a first identity authentication token; and a token module, comprising a receiving module and a verification module, configured to receive and verify the second identity authentication token sent from the mobile terminal; wherein, the electronic cigarette generates an activation signal upon successful authentication of the first and second identity authentication tokens.

According to a second aspect of the invention, a method of authenticating an electronic cigarette is provided, the method comprising: a mobile terminal acquiring anti-counterfeiting label information of an electronic cigarette located in an identification range, the electronic cigarette label information comprising a label index and a label unique identification code; the mobile terminal sending a key acquisition request carrying the label index and the label unique identification code to a service terminal; the service terminal sending a label key according to the label index and the label unique identification code to the mobile terminal; the mobile terminal sending an authentication request carrying the label key to the electronic cigarette; the electronic cigarette authenticating the label key and transmitting a random number to the mobile terminal after successful authentication; the mobile terminal sending the random number to the service terminal; the service terminal sending authentication data according to the random number to the mobile terminal; the mobile terminal generating a first identity authentication token according to the authentication data, for verification by the electronic cigarette; the electronic cigarette sending a second identity authentication token to the service terminal via the mobile terminal, for verification by the service terminal; and the electronic cigarette generating an activation signal upon successful authentication of the first and second identity authentication tokens.

According to a third aspect of the invention, an electronic cigarette is provided, comprising: a sending module, configured to send anti-counterfeiting label information comprising a label index and a label unique identification code to a mobile terminal when the mobile terminal is located within a sensing detection range, wherein the anti-counterfeiting label information is bundled with a key acquisition request by the mobile terminal to obtain a label key according to the label index and the label unique identification code from the service terminal; a receiving module, configured to receive an authentication request carrying the label key from the mobile terminal; an authentication module, configured to authenticate the label key and transmit a random number to the service terminal via the mobile terminal upon successful authentication, wherein the random number is used to obtain corresponding authentication data from the service terminal; wherein the receiving module is further configured to receive and verify a first identity authentication token sent by the mobile terminal, and wherein the sending module is further configured to send a second identity authentication token to the service terminal via the mobile terminal for verification; and a generation module, configured to generate an activation signal upon successful authentications of the first and second identity authentication tokens.

In order to more clearly describe the technical solutions of the embodiments of the present application, the drawings relating to embodiments of the invention will be briefly introduced as follows. It should be understood that the following drawings only show certain embodiments of the present application, and are not to be regarded as limiting the scope of the invention in any way. For those of ordinary skilled in the art, alternative but similar embodiments and related drawings can be created based on these drawings, without departing from invention as claimed.

DETAILED DESCRIPTION OF THE DRAWINGS

Figure 1:
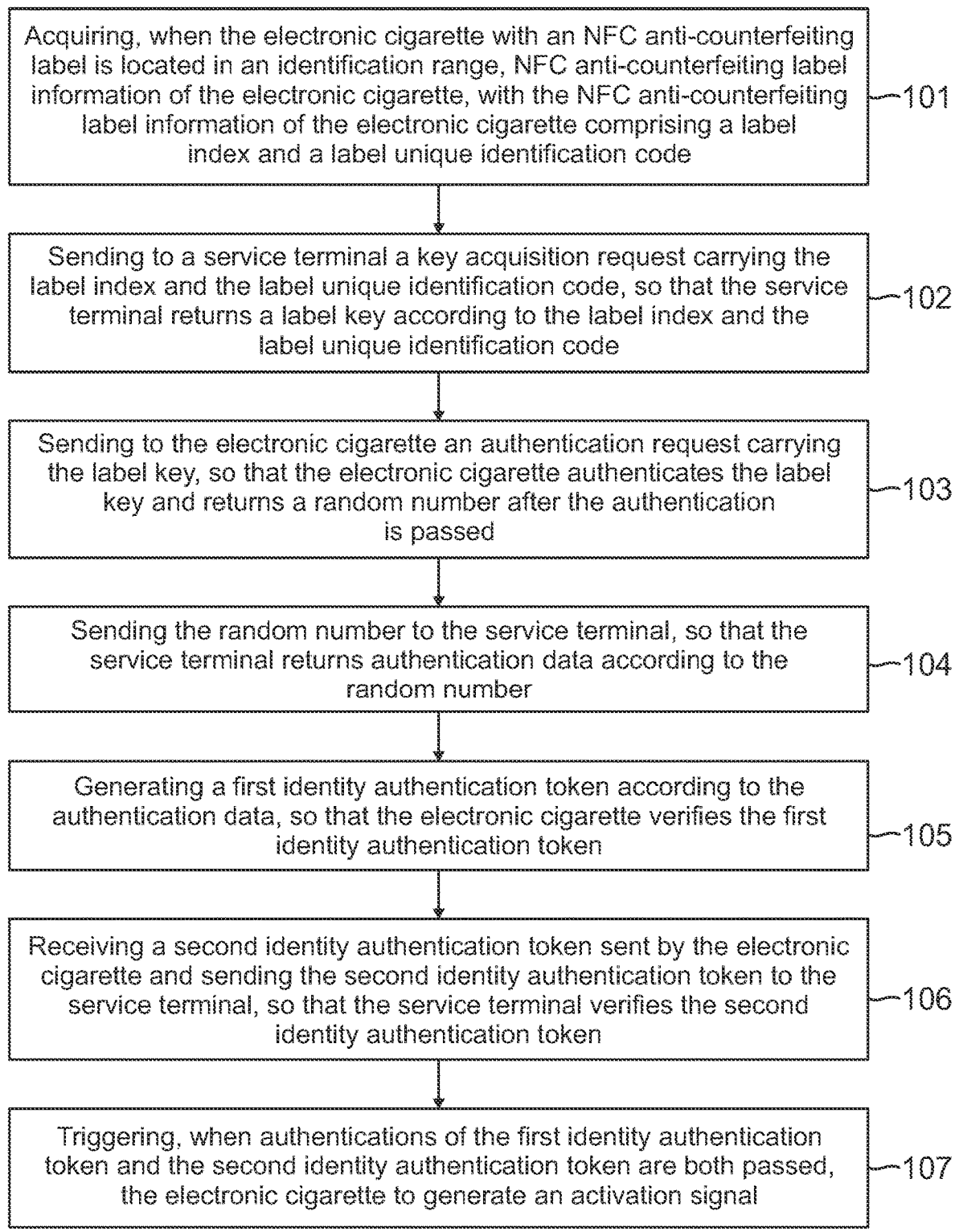
FIG. 1 is a schematic flowchart of an electronic cigarette anti-counterfeiting method for a mobile terminal.
Figure 2:
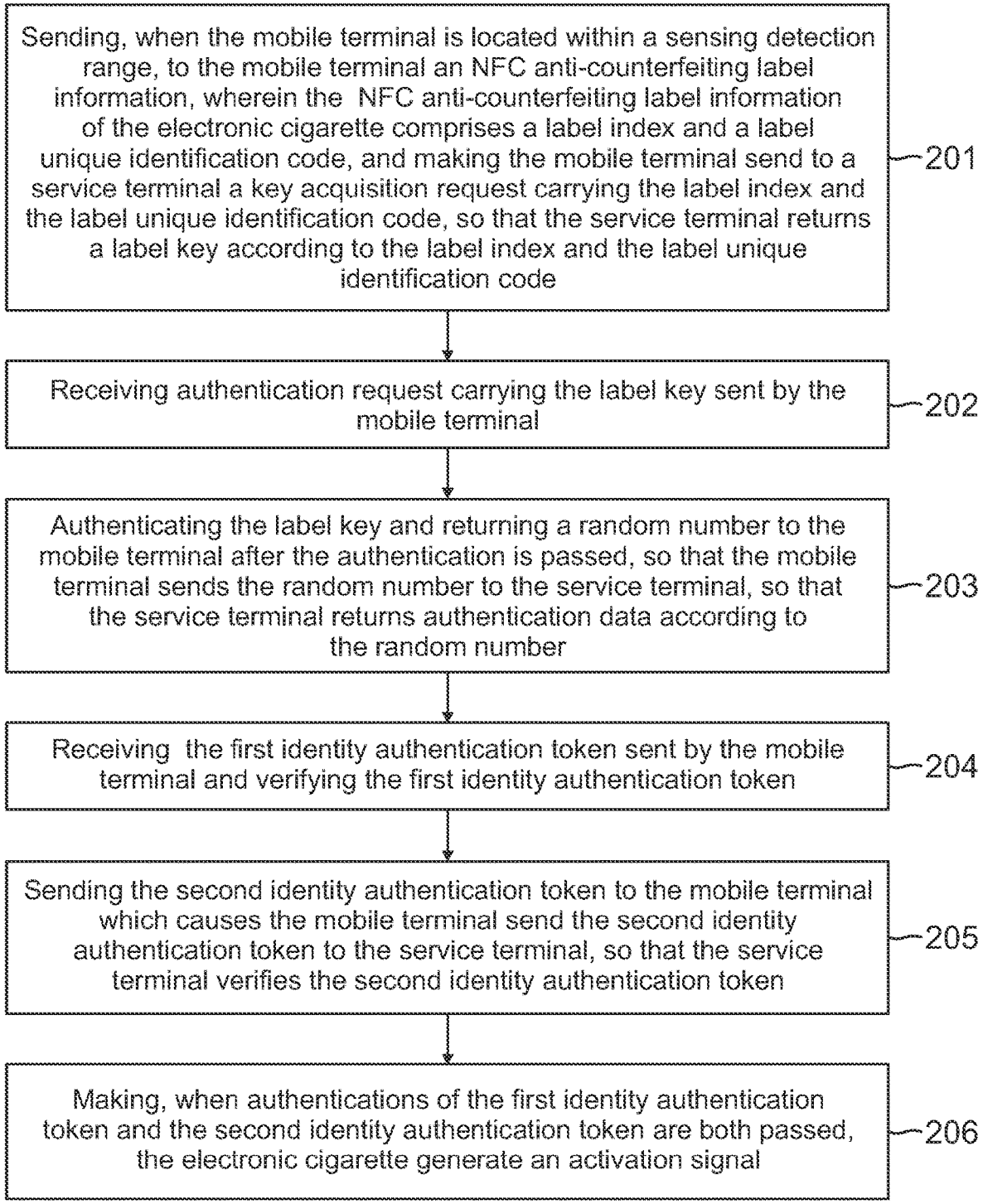
FIG. 2 is a schematic flowchart of an anti-counterfeiting method for an electronic cigarette.
Figure 3:
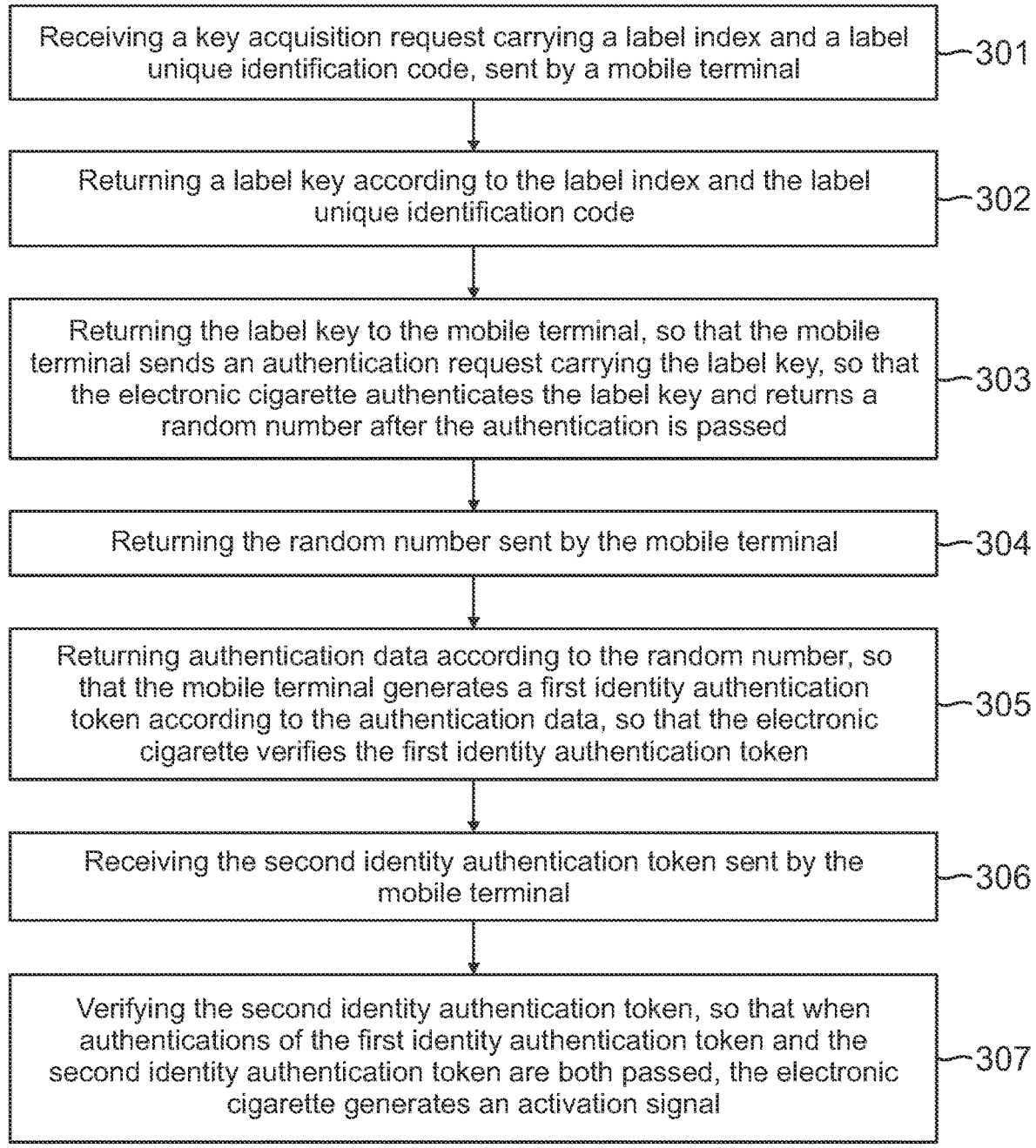
FIG. 3 is a schematic flowchart of an electronic cigarette anti-counterfeiting method for a service terminal.
Figure 9:
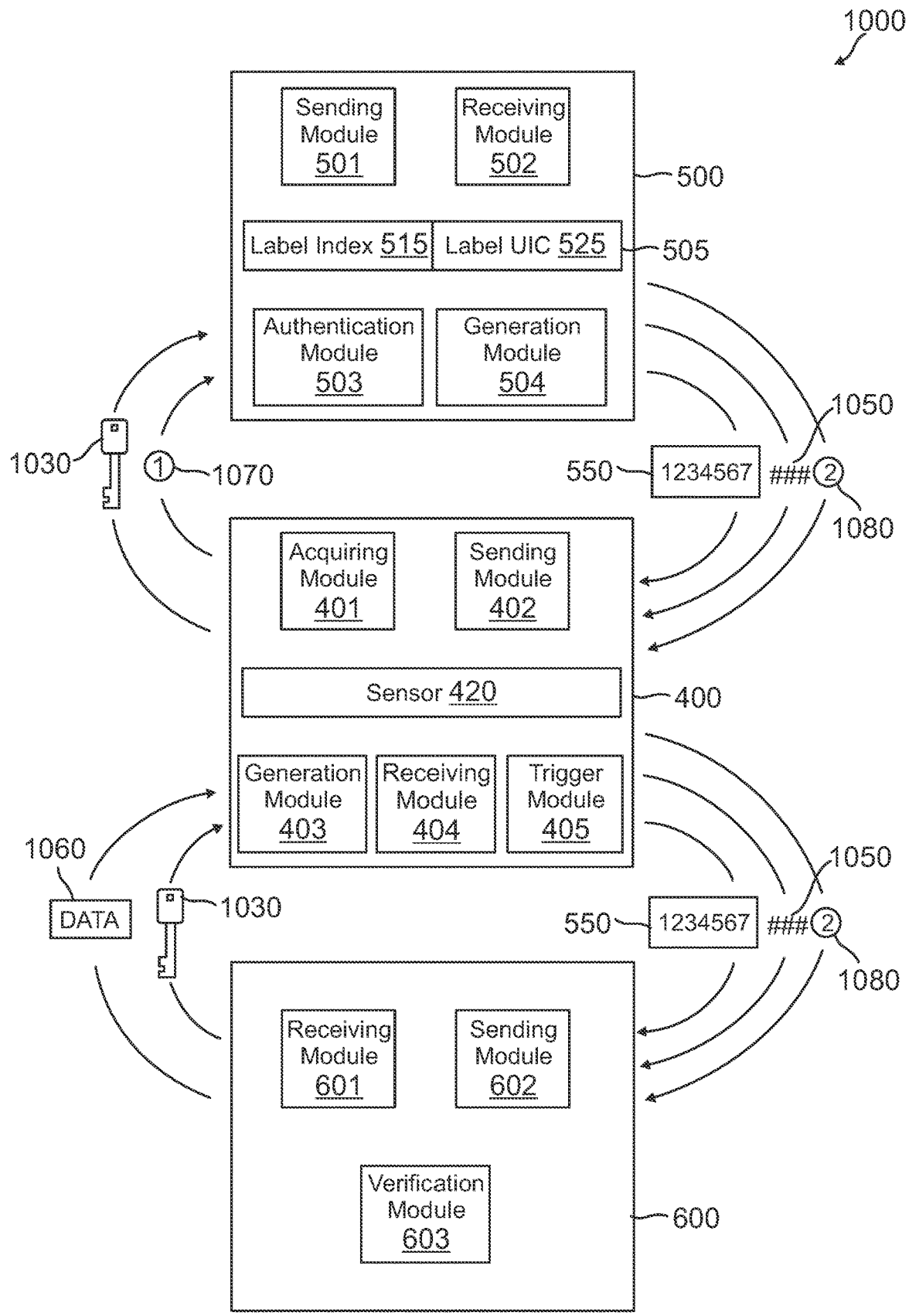
FIG. 9 is a schematic diagram showing the modules and the exchange of data between the system components.
Figure 10:
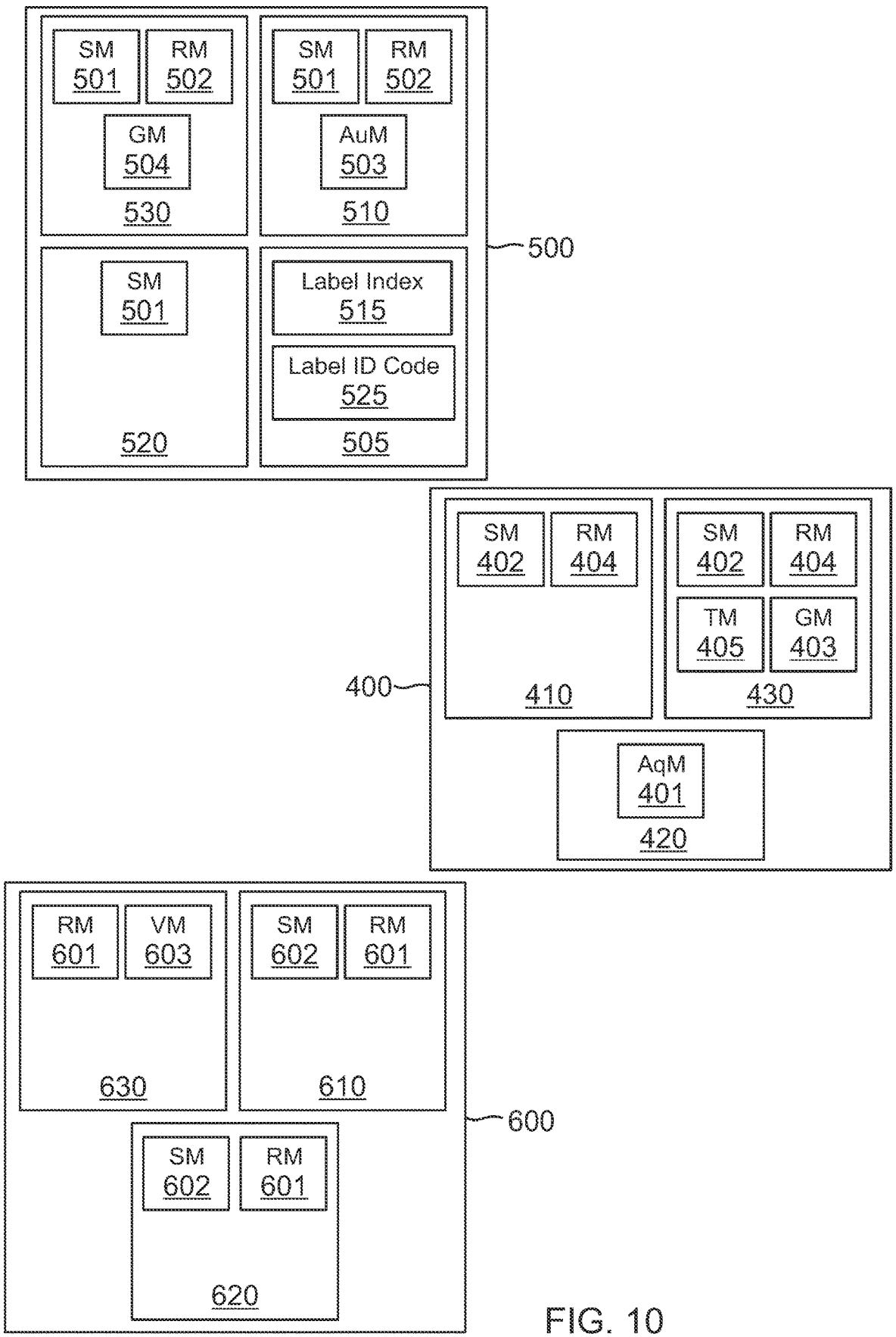
FIG. 10 is a schematic diagram showing functional modules with their associated sub-modules.

The technical solutions in the embodiments of the present application will be described below in conjunction with the drawings in the embodiments of the present application. FIGS. 1-3 provide an overview of the method and system according to the invention based on the different perspectives of the system. As shown in FIGS. 9 and 10, the system includes the following units: an electronic cigarette 500, a mobile terminal 400, and a service terminal 600. The exchange of data takes place between the electronic cigarette 500 and the mobile terminal 400, as well as between the mobile terminal 400 and the service terminal 600. The following block diagrams according to FIGS. 1-3 discuss the different perspectives, namely FIG. 1 describes the method according to the invention from the perspective of the mobile terminal 400, FIG. 2 from the perspective of the electronic cigarette 500, and FIG. 3 from the perspective of the service terminal 600.

FIG. 1 shows a block diagram describing the method according to the invention from the perspective of the mobile terminal 400. From that perspective, the method comprises:

step 101: acquiring NFC anti-counterfeiting label information 550 of an electronic cigarette 500 located in an identification range, the NFC electronic cigarette label information 550 comprising a label index 515 and a label unique identification code 525;

step 102: sending a key acquisition request 1020 carrying the label index 515 and the label unique identification code 525 to a service terminal 600, so that the service terminal 600 returns a label key 1030 according to the label index 515 and the label unique identification code 525;

step 103: sending an authentication request 1040 carrying the label key to the electronic cigarette 500, so that the electronic cigarette 500 authenticates the label key and returns a random number 1050 after successful authentication;

step 104: sending the random number 1050 to the service terminal 600, so that the service terminal 600 returns authentication data 1060 according to the random number 1050;

step 105: generating a first identity authentication token 1070 according to the authentication data 1060, for verification by the electronic cigarette 500;

step 106: receiving a second identity authentication token 1080 sent by the electronic cigarette 500 and sending the second identity authentication 1080 token to the service terminal 600, for verification by the service terminal 600; and step 107: triggering the electronic cigarette 500 to generate an activation signal 1090 when authentication of the first and second identity authentication tokens 1070, 1080 are both passed.

FIG. 2 shows a block diagram describing the method according to the invention from the perspective of the electronic cigarette 500. From that perspective, the method comprises:

step 201: sending NFC anti-counterfeiting label information 550 to a mobile terminal 400 when the mobile terminal 400 is located within a sensing detection range, wherein the NFC anti-counterfeiting label information 550 of the electronic cigarette 500 comprises a label index 515 and a label unique identification code;

step 202: receiving an authentication request 1040 from the mobile terminal 400, the authentication request 1040 carrying the label key 1030 sent by the service terminal 600 via the mobile terminal 400, wherein the label key 1030 sent to the electronic cigarette 500 is obtained by the mobile terminal 400 sending the service terminal 600 a key acquisition request 1020 with the accompanying label information 550;

step 203: authenticating the label key 1030 and transmitting a random number 1050 to the service terminal 600 via the mobile terminal 400 after the authentication is passed, wherein the random number 1050 is used to obtain corresponding authentication data from the service terminal 600;

step 204: receiving and verifying the first identity authentication token 1070 sent by the mobile terminal 400;

step 205: sending the second identity authentication token 1080 to the service terminal 600 via the mobile terminal 400 for verification; and step 206: generating an activation signal 1090, upon successful authentications of the first and second identity authentication tokens 1070, 1080.

FIG. 3 shows a block diagram describing the method according to the invention from the perspective of the service terminal 600. From that perspective, the method comprises:

step 301: receiving a key acquisition request 1020 carrying a label index 515 and a label unique identification code from a mobile terminal 400;

steps 302 and 303: transmitting a label key according to the label index 515 and the label unique identification code to the mobile terminal 400 for the generation of an authentication request 1040 to be verified by the electronic cigarette 500;

step 304: receiving the random number 1050 generated by the e-cigarette from the mobile terminal 400;

step 305: transmitting authentication data according to the random number 1050 to the mobile terminal 400 for generation of a first identity authentication token 1070 for verification by the electronic cigarette 500;

step 306: receiving the second identity authentication token 1080 sent by the mobile terminal 400; and step 307: verifying the second identity authentication token 1080, to trigger the electronic cigarette 500 to generate an activation signal 1090 when the first and second identity authentication tokens 1070, 1080 are passed.

Figure 4:
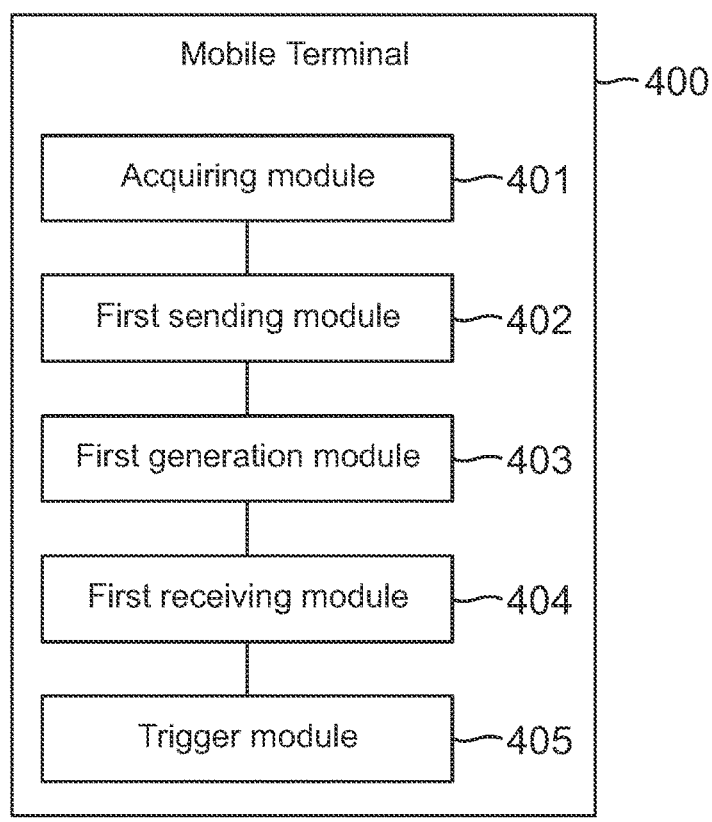
FIG. 4 is a schematic structural diagram of an electronic cigarette anti-counterfeiting mobile terminal.

In the following, the system is described in more detail by referring to FIGS. 4-10: As shown in FIG. 4, the mobile terminal 400 can comprise an acquiring module 401, a sending module 402, a generation module 403, a receiving module 404, and a trigger module 405. The acquiring module 401 can be configured to obtain information from an NFC anti-counterfeiting label 505 including a label index 515 and a label unique identification code 525. This acquiring module 401 can obtain this information by way of a visual sensor 420, camera, or other such means for acquiring visual data. The mobile terminal 400 can also include a sending module 402 configured to send a key acquisition request 1020 to a service terminal 600, along with label information obtained from the electronic cigarette 500. The sending module 402 can also send an authentication request 1040 carrying a corresponding label key 1030 to the electronic cigarette 500. This label key 1030 can be received from the service terminal 600 through a receiving module 404. The sending module 402 can also be configured to send a random number 1050 obtained from the electronic cigarette 500 by the receiving module 404 to the service terminal 600. Furthermore, the receiving module 404 can receive authentication data 1060 from the service terminal 600. A generation module 403 can generate a first identity authentication token 1070 based on the authentication data 1060, and the sending module can transmit the token 1070 to the electronic cigarette 500. The receiving module 404 may further receive a second identity authentication token 1080 from the electronic cigarette 500 and sending module 402 may transmit this token 1080 to the service terminal 600.

Finally, a trigger module 405 can be configured to trigger the electronic cigarette 500 to generate an activation signal 1090 upon authentication of the first and second identity authentication tokens 1070, 1080.

The mobile terminal 400 can take various forms depending on the embodiment and specific use of the system and method. For instance, in one embodiment the mobile terminal 400 can be a cellular device or computer, allowing consumers to verify that their product is certified and safe. In another embodiment, the mobile terminal 400 can be a barcode scanner or functional equivalent, and can be used by retailers to verify the authenticity of a shipment received by their supplier. In doing so, retailers can prevent unknowingly selling counterfeit products to the consumers. In another embodiment, the mobile terminal 400 can take multiple different forms, such that for example both a retailer and a consumer can independently verify the authenticity of the electronic cigarette 500.

Figure 5:
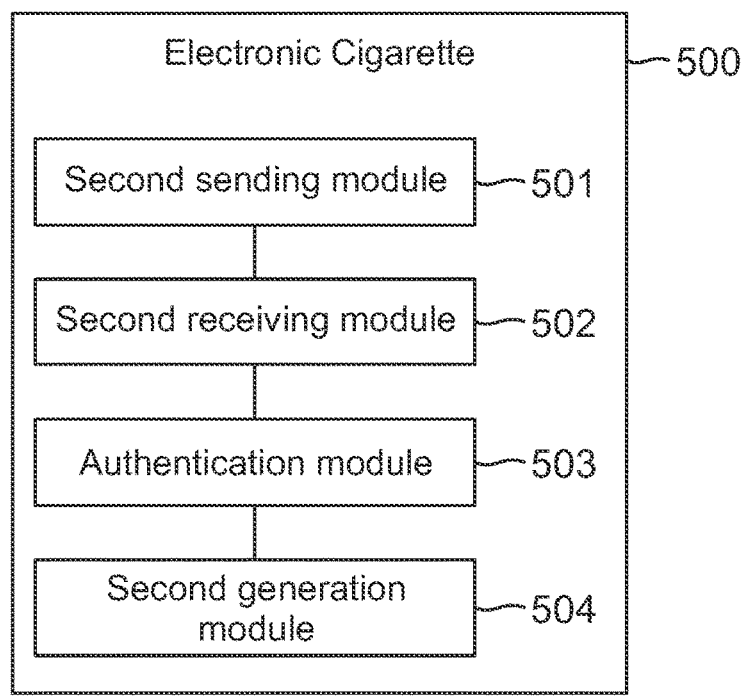
FIG. 5 is a schematic structural diagram of an anti-counterfeiting electronic cigarette.

As shown in FIG. 5, the electronic cigarette 500 can comprise a sending module 501, a receiving module 502, authentication module 503, and a generation module 504. The sending module 501 can be configured to send NFC anti-counterfeiting label information comprising label index 515 and a label unique identification code 525 to a mobile terminal 400 within a sensing detection range. The electronic cigarette 500 may also comprise a receiving module 502 configured to receive an authentication request 1040 from a mobile terminal 400 along with a corresponding label key 1030 generated by a service terminal 600. An authentication module 503 of the electronic cigarette 500 can be configured to authenticate the label key 1030, which upon successful verification can cause the generation module 504 to generate a random number 1050 for further authentication. The sending module 501 can transmit this random number 1050 to the service terminal 600 via the mobile terminal 400. Subsequently, the receiving module 502 can be configured to receive a first identity token 1070 from the mobile terminal 400, which can be verified by the authentication module 503. The generation module 504 can be configured to generate a second identity authentication token 1080, which can be sent to the service terminal 600 via the mobile terminal 400 by the sending module 501. Upon successful authentication of the first and second identity authentication tokens 1070, 1080, the generation module 504 can be configured to generate an activation signal 1090 for the electronic cigarette 500.

Figure 6:
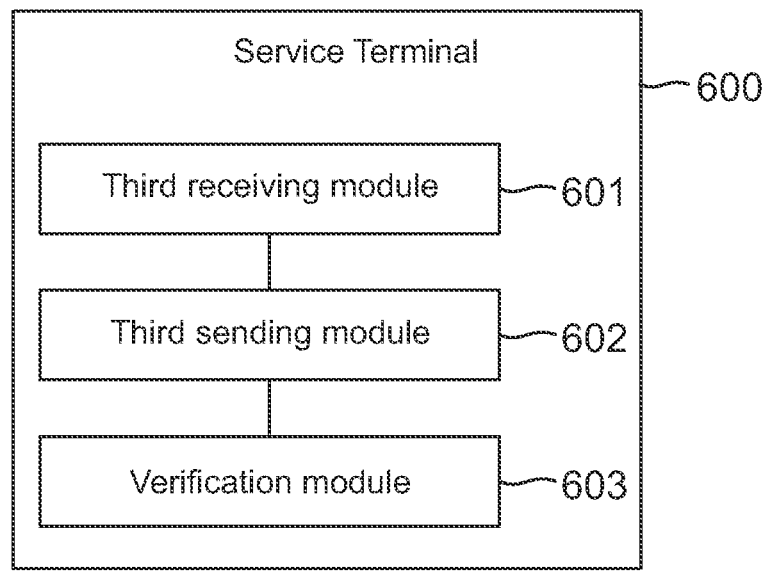
FIG. 6 is a schematic structural diagram of an electronic cigarette anti-counterfeiting service terminal.

As shown in FIG. 6, the service terminal 600 can comprise a receiving module 601, a sending module 602, and a verification module 603. The receiving module 601 can be configured to receive a key acquisition request 1020 carrying a label index 515 and label unique identification code 525 from a mobile terminal 400. The sending module 602 can transmit a label key 1030 based on the label index 515 and the label unique identification code 525 to the mobile terminal 400. The receiving module 601 can further be configured to receive from the mobile terminal 400 a random number 1050 generated by the electronic cigarette 500. The sending module 602 can be configured to transmit authentication data 1060 according to the random number 1050 to the mobile terminal 400 to aid in the generation of the first identity authentication token 1070. The receiving module 601 can subsequently receive the second identity authentication token 1080 generated by the electronic cigarette 500 from the mobile terminal 400. The verification module 603 can be configured to verify the second identity authentication token 1080, ultimately resulting in the electronic cigarette 500 generating an activation signal 1090 upon the first and second identity authentication token 1070, 1080 being successfully authenticated.

Figure 7:
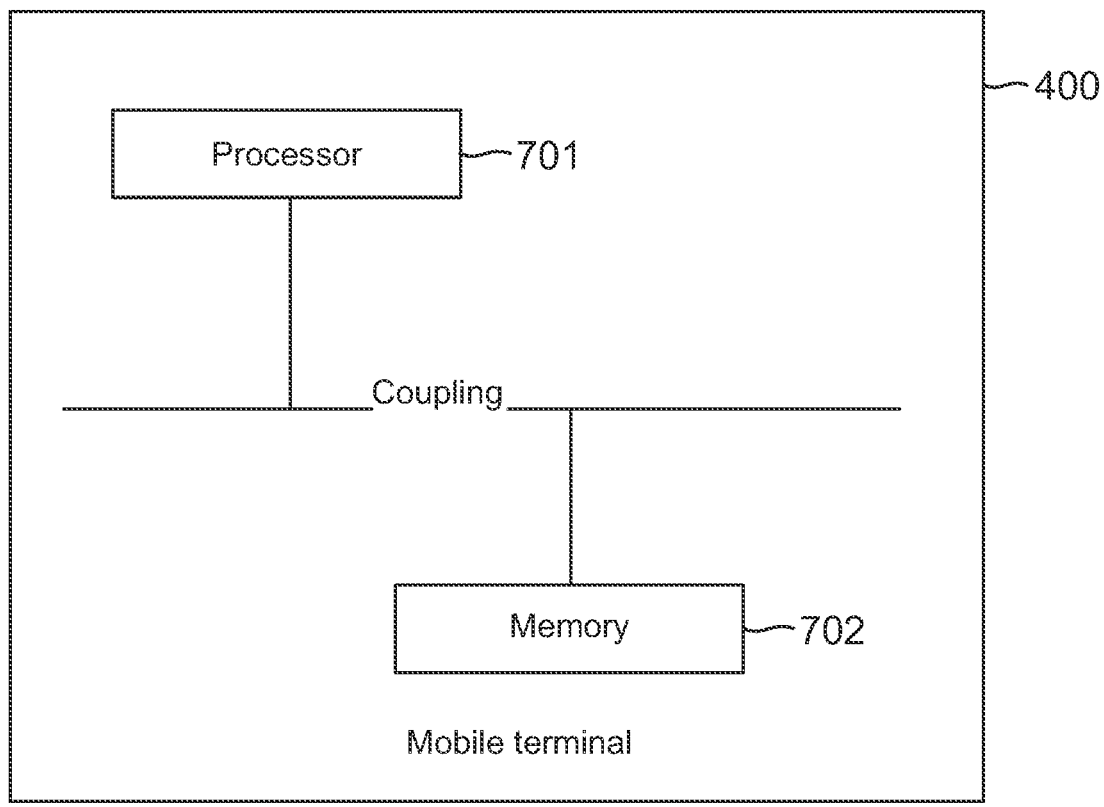
FIG. 7 is a schematic structural diagram of a mobile terminal according to the invention.

As shown in FIG. 7, the mobile terminal 400 can comprise a processor 701 coupled to a memory 702. The memory 702 can be configured to store machine-readable instructions for the processor 701 to execute an electronic cigarette anti-counterfeiting method.

Figure 8:
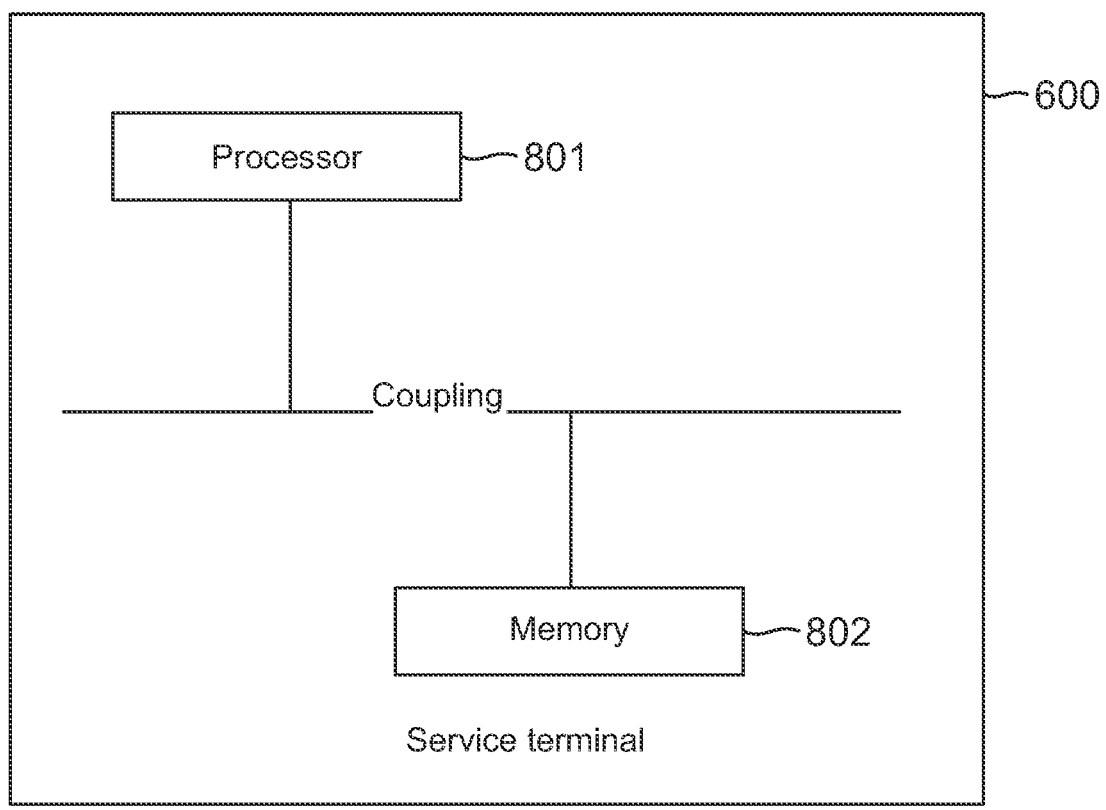
FIG. 8 is a schematic structural diagram of a service terminal according to the invention.

As shown in FIG. 8, the service terminal 600 can comprise a processor 801 coupled to a memory 802. The memory 802 can be configured to store machine-readable instructions for the processor 801 to execute an electronic cigarette anti-counterfeiting method.

The storage mediums like the memory 702 of the mobile terminal 400 shown in FIG. 7 and the memory 802 of the service terminal 600 may be storage mediums of any one of many such devices known in the art, including but not limited to: U disks, mobile hard disks, read-only memory, random access memory, magnetic disk, optical discs, hard drives, floppy disks, tapes, compact discs, DVDs, flash drives, secure digital cards, solid-state drives, etc.

According to FIG. 9, a system 1000 is provided for anti-counterfeit verification of electronic cigarettes 500, wherein the system 1000 comprises an electronic cigarette 500, a mobile terminal 400, and a service terminal 600. In a preferred embodiment, the electronic cigarette 500 and the mobile terminal 400 may be communicatively connected by near field communication (NFC) for data interaction between the elements. In other examples, the elements may be connected via Bluetooth, RFID, or other communication means known in the art. The electronic cigarette 500 can be one of various kinds according to different embodiments. A typical electronic cigarette 500 includes a battery, an atomizer, an enclosure, a mouthpiece, and a cartridge/pod 65 or tank. Such devices can be used to vaporize and inhale electronic cigarette juice, THC or CBD oil, herbs, or other chemical compositions known to be vaporized. The term "electronic cigarette" is therefore synonymous with the term "electronic vaporizer", and is in no way intended to be limited to a specific type of consumable contents 60. The electronic cigarette 500 can be provided with an NFC anti-counterfeiting label 505 attached thereto. This label 505 can be attached to the electronic cigarette 500 housing by, for example, an adhesive. Alternatively, the NFC anti-counterfeiting label 505 can be printed directly onto the electronic cigarette 500 housing or shell, or any other component of the electronic cigarette 500. In yet another embodiment, the identification label 505 can be etched or engraved into the housing by lasers or other means. This NFC anti-counterfeiting label 505 may include NFC anti-counterfeiting label information 550 such as a label index 515 and a unique label identification code 525. The electronic cigarette may further include a sending module 501, a receiving module 502, an authentication module 503, and a generation module 504, configured to receive, transmit, authenticate, and generate data related to the authentication of an electronic cigarette 500. In one embodiment, the electronic cigarette 500 may receive a label authentication request 1040 carrying a label key 1030 generated by a service terminal 600.

The generation module 504 may be further configured to, upon successful authentication of the label key 1030, generate a random number 1050 to transmit to the mobile terminal 400. This random number 1050 is part of the encryption process, and is ultimately used to generate identity authentication tokens 1070, 1080. This string of random numbers can be of any length known in the art to ensure security, such as for example forty characters. In alternative embodiments, a pseudorandom number generator (PRNG) can be utilized, wherein a data that analytically appears random is produced by computer algorithm.

The receiving module 502 can be configured to receive a first identity authentication token 1070 and the authentication module 503 can be configured to verify said first token 1070. This first identity authentication token 1070 may be generated by a mobile terminal 400 based on authentication data 1060 provided by a service terminal 600 based on the random number 1050 generated and transmitted by the electronic cigarette 500. Furthermore, the generation module 504 may generate a second identity authentication token 1080 and transmit the token 1080 to a service terminal 600 for verification. In a preferred embodiment, the second identity authentication token 1080 is transmitted from the electronic cigarette 500 to the mobile terminal 400, and from the mobile terminal 400 to the service terminal 600. In another embodiment, the second identity authentication token 1080 may be transmitted directly from the electronic cigarette token module 530 to the service terminal 600. Verification of the first and second identity authentication tokens 1080 may trigger activation of the electronic cigarette 500, which may be locked from use until such certification is successfully completed. In an optional aspect of the invention, the label information 550 may be made available to a consumer upon the successful activation of the electronic cigarette 500, for instance by means of a mobile device application or a webpage.

The invention also includes a mobile terminal 400 comprising a sensor 420, an acquiring module 401, a sending module 402, a generation module 403, a receiving module 404, and a trigger module 405. The sensor 420 may be configured to acquire NFC anti-counterfeiting label information 550 from the NFC anti-counterfeiting label 505 of electronic cigarette 500 located in an identification range, which can range from millimeters to several meters. In one example, the identification range can be very minimal, such that contact between the mobile terminal 400 and the electronic cigarette 500 is required to transmit the label information 550. A very small range is advantageous when many e-cigarettes 500 are in close proximity, increasing the likelihood of an unintended label other than the target label 505 being authenticated, for example a retailer seeking to authenticate a large shipment of e-cigarette 500. In another example, the identification range can be several meters, for instance five meters or more. The range can also be adjusted according to the specific needs of an authenticator. The sensor 420 may be one of many types operable to obtain visual data, for example a camera 80, LiDAR sensor, etc.

In an alternative embodiment, the contents of a pod or cartridge 65 of the electronic cigarette 500 can operate as the unique identification code 525 or a supplement thereto, wherein at least one property of the consumable contents 60 is used for verification. The property can be, for example, density, chemical composition, viscosity, color, specific gravity, etc. This additional verification parameter can serve as a safeguard against counterfeit labels, helping ensure the contents 60 are certified.

The generation module 403 of the mobile terminal 400 can generate a first identity authentication token 1070 based on authentication data 1060 received from the service terminal 600.

The service terminal 600 may include a receiving module 601, a sending module 602, and a verification module 603. The sending module 602 of the service terminal 600 can be configured to transmit a label key 1030 to the mobile terminal 400 based on a key acquisition request 1020 received from the mobile terminal 400 by the receiving module 601. This key acquisition request 1020 can include corresponding label information 550 including the label index 515 and the unique label identification code 525.

In addition, the sending module of the service terminal 600 may be configured to transmit authentication data 1060 to the mobile terminal 400. This authentication data 1060 can correspond to the random number 1050 transmitted by the electronic cigarette 500. This authentication data 1060 can be utilized by the mobile terminal 400 to generate the first identity authentication token 1070. Finally, the service terminal 600 can, using the receiving module 601 and verification module 603, receive and verify the second identity authentication token 1080. As such, there is an exchange of tokens based on data transferred from the electronic cigarette 500 to the service terminal 600, and from the service terminal 600 to the electronic cigarette 500. This exchange of identity authentication tokens 1070, 1080 can be facilitated by the mobile terminal 400, which can act as an intermediary between the two elements. Alternatively, this data can be transmitted directly between the electronic cigarette 500 and the service terminal 600, with functions of the mobile terminal 400 being performed by one of the electronic cigarette 500 and the service terminal 600.

FIG. 10 shows modules of the electronic cigarette 500, the mobile terminal 400, and the service terminal 600, further partitioned into sub-modules. The electronic cigarette 500 includes an NFC anti-counterfeiting label 505, a label information module 520, a label key module 510, and a token module 530. The NFC anti-counterfeiting label 505 can include a label index 515 and a unique label identification code 525. The label index 515 stored on the electronic cigarette 500 includes a specific unique code. In one example assembly, this is an 8 bit code. The unique label identification code 525 can start with the first bit 0xD3 for the identification of the starting point of the unique ID. As a further illustration, the second bit can be at 0xE7, which features information regarding in which factory the electronic cigarette 500 was manufactured. The remaining 6 bits can identify other aspects of the electronic cigarette 500. The label index 515 can include any number of information parameters relating to the e-cigarette 500 being verified for authenticity. For instance, the label index 515 could include the manufacturing date, the manufacturing company, the manufacture location, the technical specifications, the market price, the color, the ingredients of the contents, the serial number, the company's contact information, among other parameters. Furthermore, the unique label identification code 525 can be an individual code corresponding to the respective electronic cigarette 500, comprising any combination of numbers, letters, symbols, signals, codes, or other identifiers unique to the specific unit for individual identification of the device. All of the unique identification codes 525 are stored on a cloud database before production of the electronic cigarette 500.

The label information module 520 can comprise a sending module 501, configured to transmit the NFC anti-counterfeiting label information 550 including the label index 515 and unique label identification code 525 to the mobile terminal 400. For instance, this information can be transmitted by the sensor 420 scanning or otherwise obtaining the label information 550 to effect data/information transmittal.

The label key module 510 can comprise a receiving module 502, a sending module 501, and an authentication module 503. The receiving module 502 can be configured to receive an authentication request 1040 carrying a label key 1030, wherein the authentication request 1040 is transmitted by the mobile terminal 400. This authentication request 1040 can be bundled to or carry a label key 1030 generated by the service terminal 600. The authentication module 503 can be configured to authenticate the label key 1030 assuming the requisites for authentication are fulfilled. The sending module 501 can be configured to transmit a random number 1050 to the mobile terminal 400 after successful label key authentication.

The token module 530 can comprise a sending module 501, a receiving module 502, and a generation module 504. The receiving module 502 can be configured to receive a first identity authentication token 1070 transmitted by the mobile terminal 400. This first identity authentication token 1070 can be generated based on authentication data 1060 provided by the service terminal 600. The sending module 501 can be configured to transmit a second identity authentication token 1080 to the mobile terminal 400 for verification by the service terminal 600. Generally, the second identity authentication token 1080 is not transmitted until after verification of the first identity authentication token 1070 by the electronic cigarette 500. After both the first and second identity authentication tokens 1070, 1080 have been authenticated, the generation module 504 can be configured to generate an activation signal 1090 to enact operation of the electronic cigarette 500.

The mobile terminal 400 includes a label key module 410, a sensor 420, and a token module 430. The sensor 420 can comprise an acquiring module 401 configured to acquire NFC anti-counterfeiting label information 550 from the NFC anti-counterfeiting label 505 of an electronic cigarette 500. This acquisition can occur when the sensor 420 is located within an identification range of the electronic cigarette 500. Depending on the embodiment, the identification range can be millimeters or several meters away. The label key module 410 comprises a sending module 402 and a receiving module 404. The sending module 402 can be configured to transmit a key acquisition request 1020 carrying the label index 515 and the unique label identification code 525 of the electronic cigarette 500 to the service terminal 600. The sending module 402 can further be configured to transmit an authentication request 1040 to the electronic cigarette 500, wherein the authentication request 1040 carries the label key 1030. Additionally, the sending module 402 can be configured to transmit the random number 1050 received from the electronic cigarette 500 to the service terminal 600. The receiving module 404 can be configured to receive label key 1030 from the service terminal 600. Additionally, the receiving module 404 can be configured to receive the random number 1050 from the electronic cigarette 500.

The token module 630 can comprise a generation module 403, a receiving module 404, a sending module 402, and a trigger module 405. The generation module 43 can be configured to generate a first identity authentication token 1070 based on the authentication data 1060 received from the service terminal 600. The sending module 402 can be configured to transmit a first identity authentication token 1070 to the electronic cigarette 500. Additionally, sending module 402 can be configured to transmit the second identity authentication token 1080 to the service terminal 600. The receiving module 404 can be configured to receive the second identity authentication token 1080 from the electronic cigarette 500, to facilitate the transmission of the second identity authentication token 1080 to the service terminal 600. The trigger module 405 can be configured to trigger the electronic cigarette 500 in generating an activation signal 1090 upon successful authentication of the first and second identity authentication tokens 1070, 1080.

The service terminal 600 includes a label key module 610, an authentication data module 620, and a token module 630. The label key module 610 further comprises a receiving module 601 and a sending module 602. The receiving module 601 is configured to receive from the mobile terminal 400 a key acquisition request 1020 carrying a label index 515 and a label unique identification code 525. The sending module 602 is configured to transmit to the mobile terminal 400 a label key 1030 based on the key acquisition request 1020 for authentication by the electronic cigarette 500.

The authentication data module 620 comprises a sending module 602 and a receiving module 601. The receiving module 601 can be configured to receive a random number 1050 from the mobile terminal 400. Prior to receipt, the random number 1050 can be provided to the mobile terminal 400 by the electronic cigarette 500 following the authentication of the label key 1030. The sending module 602 can be configured to transmit authentication data 1060 to the mobile terminal 400 corresponding to the random number 1050 transmitted by the electronic cigarette 500. The authentication data 1060 can be used by the mobile terminal 400 to generate a first identity authentication token 1070.

The token module 630 comprises a receiving module 601 and a verification module 603. The receiving module 601 can be configured to receive the second identity authentication token 1080 from the mobile terminal 400. The verification module 603 can be configured to verify the second identity authentication token 1080 received from the mobile terminal 400. Upon verification of both the first and second identity authentication token 1070, 1080, the electronic cigarette 500 can generate an activation signal 1090 to commence operation.

Figure 11:
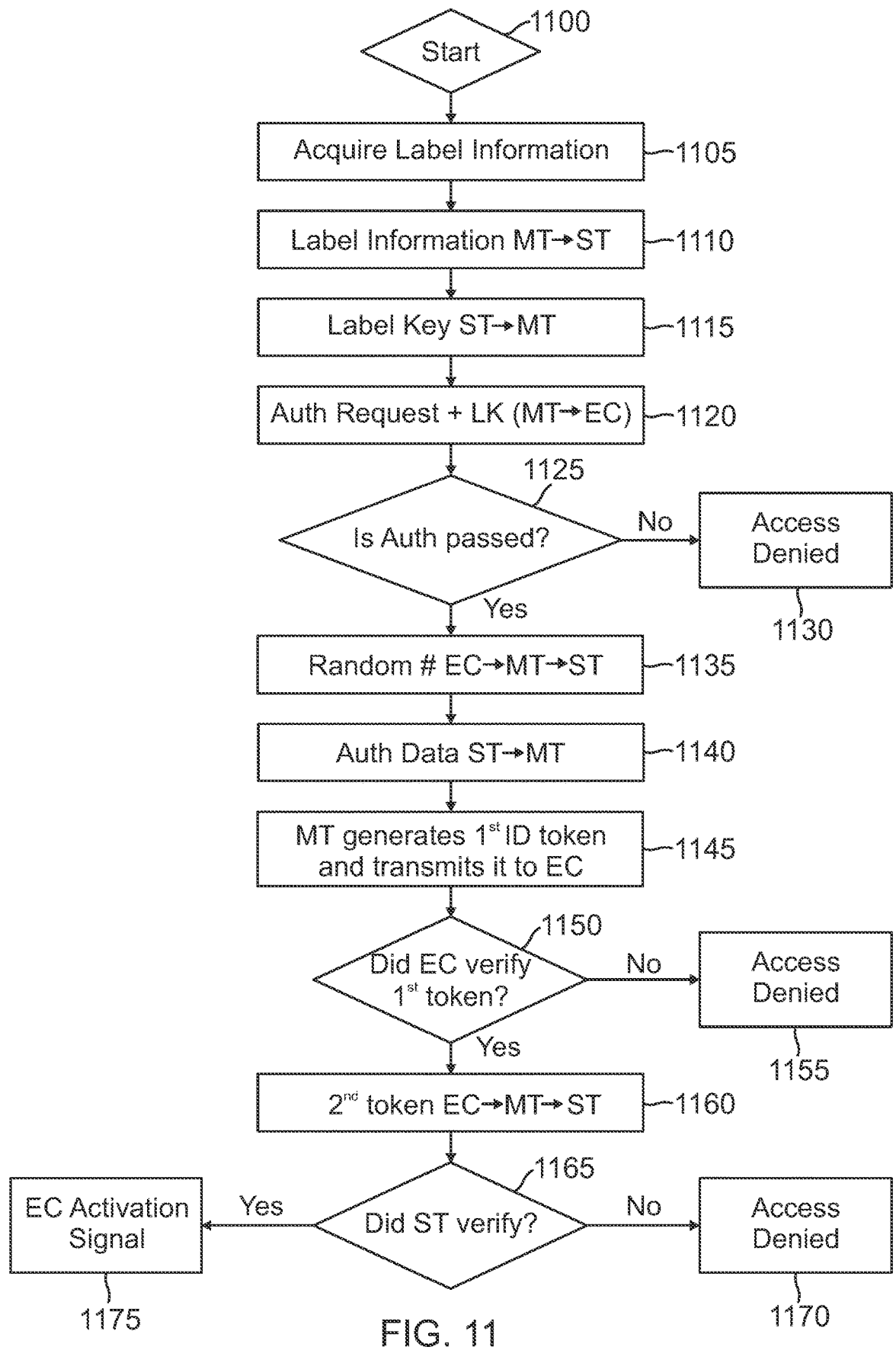
FIG. 11 is a schematic flowchart of the electronic cigarette anti-counterfeiting method.

FIG. 11 shows a schematic flow chart of the anti-counterfeiting method of the described system. This method has already been demonstrated by the block diagrams according to FIGS. 1-3 from the various perspectives of the mobile terminal, electronic cigarette and service terminal. FIG. 11 shows the authentication method as a whole in the form of a flowchart. The process starts according to step 1100 when a mobile terminal 400 is in close enough proximity to the electronic cigarette 500 to acquire label information 550 from the electronic cigarette anti-counterfeiting label 505. In step 1105, the mobile terminal 400 acquires the label information 550, which can comprise a unique label information code 525 and a label index 515. In step 1110, the label information 550 is transmitted from the mobile terminal 400 to the service terminal 600. This prompts the service terminal 600 to return a label key 1030 to the mobile terminal 400 per step 1115. In step 1120, the label key 1030 is transmitted from the mobile terminal 400 to the electronic cigarette 500 along with an authentication request 1040. In step 1125, it is then inquired whether authentication is passed. This can for example depend on whether the product sought to be activated is of the correct kind. If it is not of the correct kind, access is denied according to step 1130. However, if it is of the correct kind, the process proceeds to step 1135 which involves a random number 1050 created by a random number generator to be transmitted from the electronic cigarette 500 to the service terminal 600 via the mobile terminal 400. In step 1140, authentication data 1060 is then returned from the service terminal 600 to the mobile terminal 400. In step 1145, the mobile terminal 400 uses this authentication data 1060 to generate and transmit a first identification token 1070 to the electronic cigarette 500. In step 1150 it is inquired whether the electronic cigarette 500 was able to verify this first identification token 1070. If it is not successfully verified, access is denied per step 1155. However, if it is successfully verified, a second identification token 1080 is transmitted from the electronic cigarette 500 to the service terminal 600 via the mobile terminal 400 according to step 1160. In step 1165, it is finally inquired whether the service terminal 600 successfully verified the second identification token 1080. If it was not successfully verified, access is denied per step 1170. Alternatively, if the service terminal 600 successfully verifies the second identification token 1080, an activation signal 1090 can be generated in the electronic cigarette 500 per step 1175.

Figure 12:
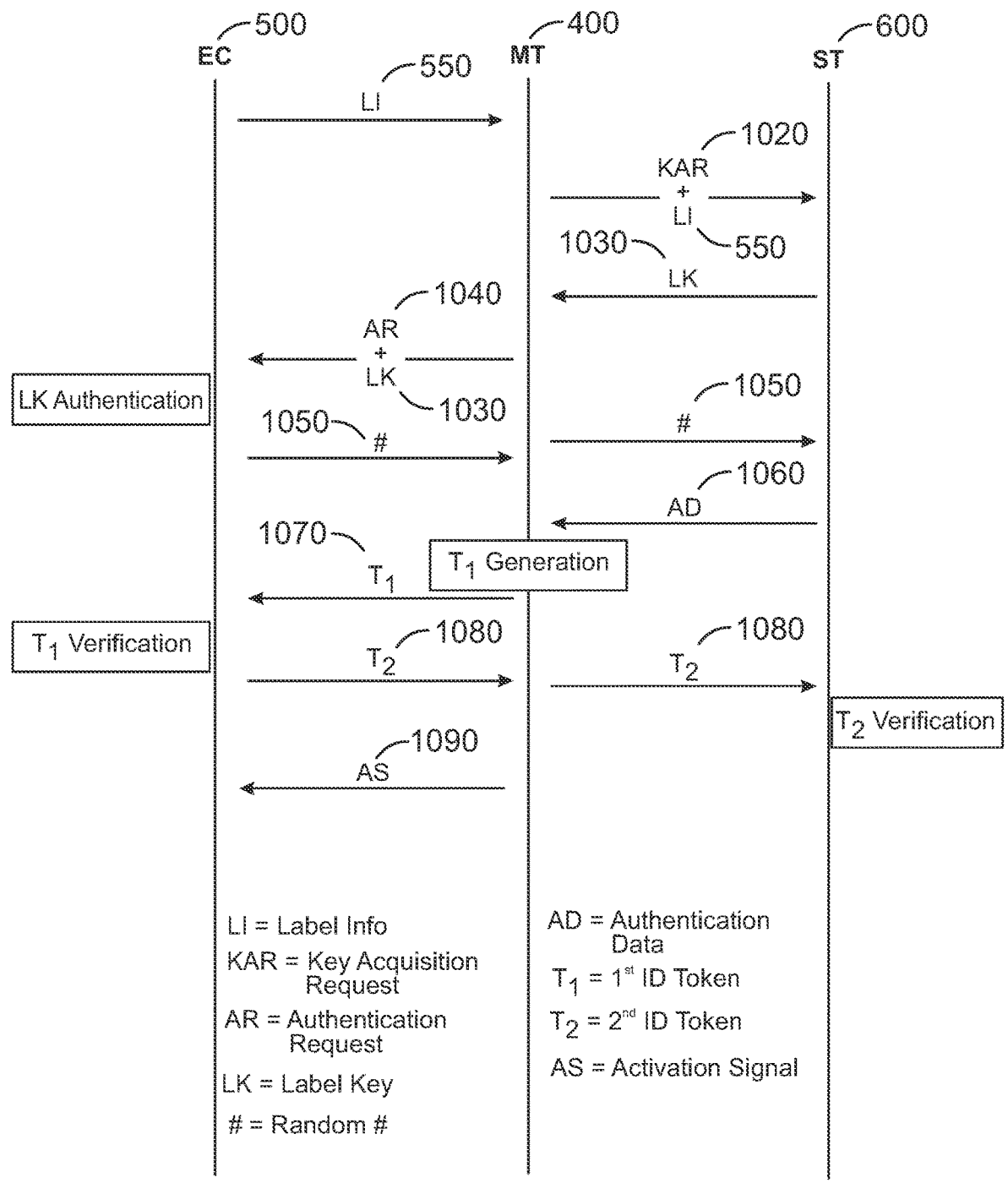
FIG. 12 is a schematic authentication protocol chart showing chronological transfer of data.

FIG. 12 shows a schematic authentication protocol chart representing the interchange of information between the electronic cigarette 500, the mobile terminal 400, and the service terminal 600. The label information 550 (LI) is transmitted from the electronic cigarette 500 to the mobile terminal 400. The mobile terminal 400 adds a key acquisition request 1020 (KAR) to the label information (LI) and transmits this information to the service terminal 600. The service terminal 600 proceeds to transmit a label key 1030 (LK) to the mobile terminal 400, which adds an authentication request 1040 (AR) and transmits the bundled authentication request 1040 (AR) and label key 1030 (LK) to the electronic cigarette 500. The electronic cigarette 500 then authenticates the label key 1030 (LK), and upon authentication transmit a random number 1050 (#) to the service terminal 600 via the mobile terminal 400. The service terminal 600 subsequently transmits authentication data 1060 (AD) to the mobile terminal 400, which the mobile terminal 400 utilizes to generate a first identity authentication token 1070 (T1). The first identity authentication token 1070 (T1) is then transmitted to the electronic cigarette 500, where the first identity authentication token 1070 (T1) is verified. Upon verification of the first identity authentication token 1070 (T1), the electronic cigarette 500 transmits a second identity authentication token 1080 (T2) to the service terminal 600 via the mobile terminal 400. The service terminal 600 then verifies the second identity authentication token 1080 (T2), allowing the activation signal 1090 to be generated by the electronic cigarette 500.

Figure 13:
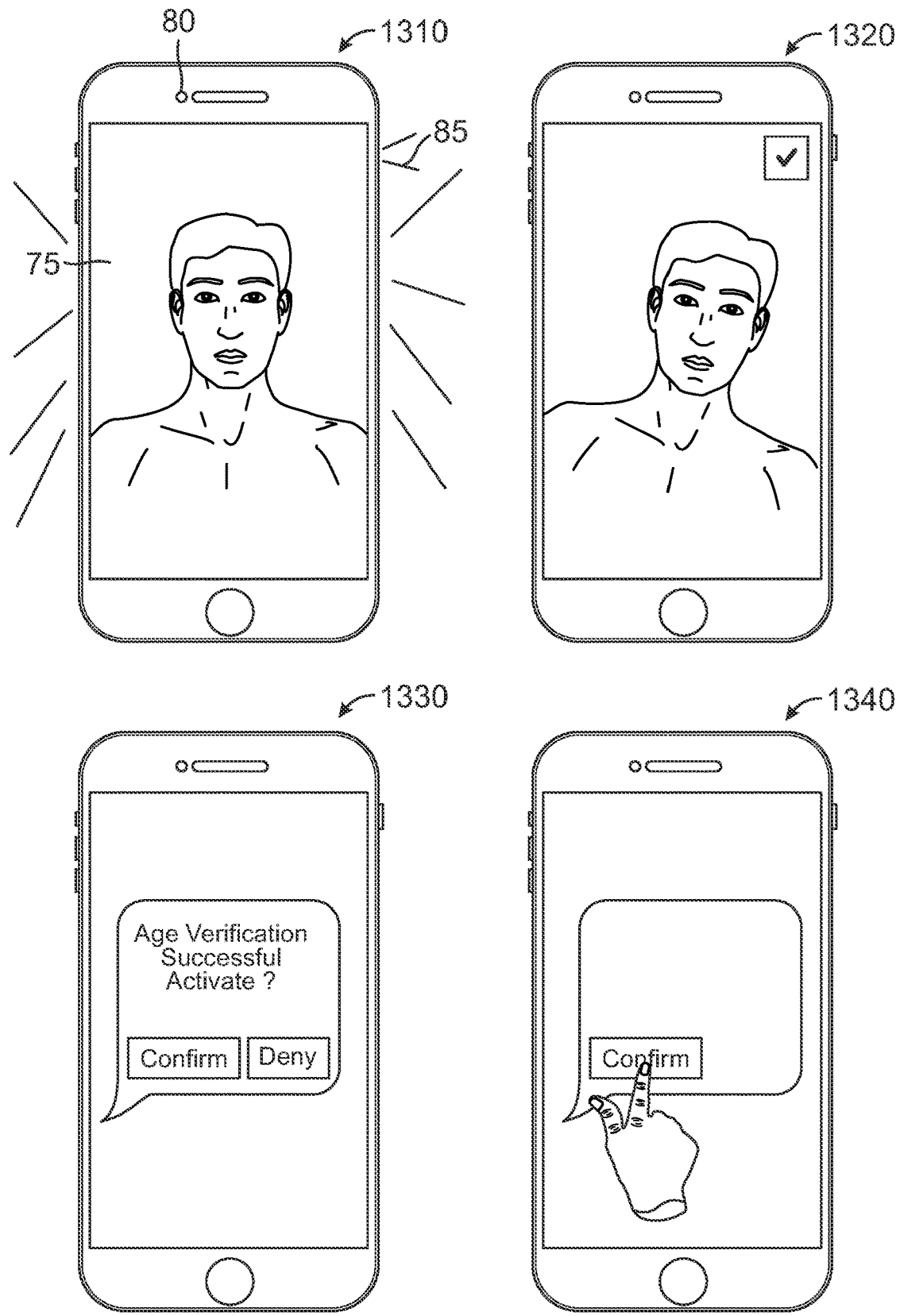
FIG. 13 is a visual representation of the age-verification face identification procedure.

FIG. 13 shows a visual representation of the age-verification age identification procedure according to the invention, demonstrating the age verification by screenshots 1310, 1320, 1330 and 1340. The anti-counterfeiting system can further comprise this age-verification module to determine whether the consumer is old enough to use the incident product. The age threshold can be equal to or greater than the age restrictions in the jurisdiction the devices being sold, for example twenty-one in the United States and eighteen in Europe. As demonstrated by screenshot 1310, the mobile terminal 400 can acquire face data and identity information of a user, for instance through a camera or other visual sensor 420 housed in or on the mobile terminal 400. In another embodiment, the face data and identity information can be obtained through the electronic cigarette 500 or service terminal 600, and can be transmitted to the mobile terminal 400 for age-verification. Following acquisition of the face data and identity information of a user, the face data and identity information can be evaluated to determine the age of the user and produce or obtain an age recognition result, as demonstrated by screenshot 1320. The indication of age-verification displayed on the screen can include a green check to denote a positive result corresponding to a sufficiently old user, and a red cross to denote a negative result corresponding to an underage user. If the determination is negative but the consumer is in fact of age, a further override can be performed, wherein a second age-verification determination can be performed. For instance, the initial determination can be made based on face data and identity information acquired by the age-verification module, and the secondary override determination can be performed based on a valid identification document 30, such as a driver's license. After obtaining an age recognition result, an activation prompt can be generated and displayed to the user, as demonstrated by screenshot 1330, and in case of the mobile terminal 400 being a smart phone with a touchscreen, can be confirmed as demonstrated by screenshot 1340. This prompt can include a confirmation instruction option that when inputted, commences detection of electronic cigarette 500 located within a recognition range.

Alternatively, the age verification can be achieved through scanning an identity document 30 such as a driver's license or passport and evaluating age based on the date provided on the identity document 30. In another example, age can be verified by a combination of the birth date and photograph. After obtaining an age recognition results based on the face data and identity information, if age verification is passed, the mobile terminal 400 can generate and display an activation prompt. A user can then be prompted to input an activation confirmation instruction to commence authentication of the electronic cigarette 500.

The verification process can include prompting the user to be verified to perform specific facial gestures to verify that it is an actual human being imaged. This is to prevent fraud by users attempting to circumvent the verification process by imaging a photograph or wearing a mask. The specific facial gestures can include, for example, sticking one's tongue out, smiling, frowning, closing one's eyes, winking, or other such gestures. In addition, there can be a light 85 of varying color or warmth that can be shone on the consumer corresponding to the specific prompted facial gesture. This light 85 can be provided by a screen 75 on a mobile terminal 400 in the configuration where a back facing camera 80 is used to verify the consumer, or by a light 85 parallel to the line of sight of the front facing camera 80 or sensor 420. For instance, a lighted flash can be directed at the prospective user, so as to provide a unique image with a specific color and specific facial gesture that cannot otherwise easily be replicated by a fraudulent user attempting to circumvent the security measure. In one example, a user can be prompted to wink at the camera 80 while a blue light 85 is being projected onto the user's face, and this moment can be imaged for verification purposes.

Prior to generation of an activation signal 1090 following successful verification protocol, the electronic cigarette 500 can be locked by mechanical means, electrical means, or a combination thereof. The mechanical block can include a component housed inside or provided outside of the electronic cigarette 500 to effectively block use or operation of the electronic cigarette 500 prior to authentication. For instance, a plate could be provided between the heating chamber and the mouthpiece, between the heating chamber and juice/oil/substance chamber, or between the juice/oil/substance chamber and the mouthpiece. This would prevent a consumer from consuming the vapor without prior authentication and generation of an activation signal 1090. The authentication can merely require a single authentication procedure or can require a new authentication upon every instance of use. Upon authentication, the activation signal 1090 could serve to displace the blocking plate to allow regular operation of the electronic cigarette 500. This displacement could include the plate folding such that it is parallel to the flow of vapor rather than perpendicular to it.

Alternatively, the blocking plate can be divided at its center such that the ends fold into sides of the electronic cigarette 500 housing opposite one another. The blocking plate can be formed to near-seamlessly integrate into the wall/housing of the electronic cigarette 500 upon displacement.

In another embodiment, the mechanical block can include not allowing the pod/cartridge 65 to be inserted into the electronic cigarette 500 until authentication is made. For instance, a blocking protrusion can act as a barrier to the entry of a pod/cartridge 65. Upon authentication, the blocking protrusion can recede into the housing as to allow regular operation of the device. After removal of a depleted pod/cartridge 65, the blocking protrusion can again raise to allow for the replacement pod/cartridge 65 to likewise be authenticated as described. This mechanism could be effective for instances where a replacement pod/cartridge 65 is purchased for use with the electronic cigarette 500. One advantage of doing this would be to prevent use of a substance 60 not compatible with the electronic cigarette 500, for example use of a substance 60 that has too high of a density to effectively be vaporized by the electronic cigarette 500. This can also prevent accidental use of a substance 60 that is not certified and may pose hazards or include unwanted/unknown ingredients from being inhaled by a consumer.

In another embodiment, an electrical block can prevent operation of the electronic cigarette 500 prior to successful authentication and generation of an activation signal 1090. In one embodiment, the electric components (i.e. atomizer or equivalent) can be prevented from heating up until the activation signal 1090 is generated. Thus, a user can check the charge on the electronic cigarette 500 and perform other functions associated with the electronic cigarette 500, but will be prevented from actually inhaling the contents in the pod/cartridge/chamber 65 until verification is successfully achieved. In other embodiments, various functionalities can be disabled until authentication is achieved. It is advantageous to allow some operation of the electronic cigarette 500 to be performed even prior to authentication, for example checking on the battery charge on the electronic cigarette 500. However, in other embodiments all functions of the electronic cigarette 500 could be blocked prior to authentication to more definitively ensure prevention of use of unauthorized pods/cartridges 65 containing unverified consumable contents 60 or use by underage consumers.

Instead of, or in addition to, the face data and identity information verification, the system 1000 can also include a fingerprint authentication module to allow the age of the user to be verified once, and allow the age verification for subsequent uses to be streamlined. Requiring fingerprint authentication for each use can prevent an adult from performing a one-time age authentication procedure, and allowing an underage consumer from using a pod 65 or electronic cigarette 500 in general without subsequent authentications. A fingerprint authentication profile can be created on an application and can be used in conjunction with a fingerprint reading module/sensor 420 on the electronic cigarette 500. The user could then be required to provide their fingerprint prior to every use of the electronic cigarette 500. Multiple user profiles could be created on the application and be associated with a single electronic cigarette 500 so that the electronic cigarette 500 is not restricted to a single user.

Figure 14:
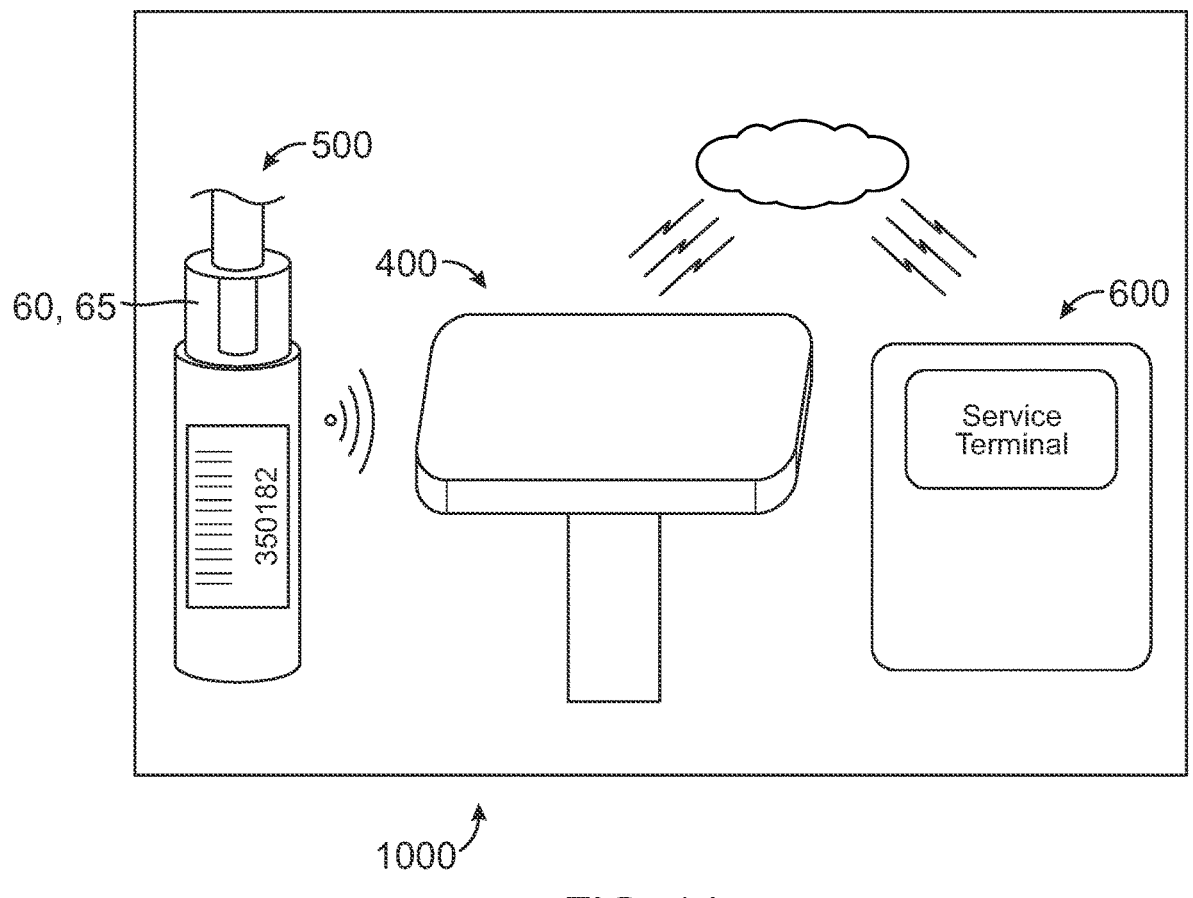
FIG. 14 schematically demonstrates the authentication system according to the invention.

FIG. 14 demonstrates the system 1000 as a whole, including the e-cigarette 500, the mobile terminal 400 and the service terminal 600. Preferably, the mobile terminal 400 is connected to the service terminal 600 through the cloud. The electronic cigarette can include a cartridge 65 containing vaporizable consumable contents 60.

Figure 15:
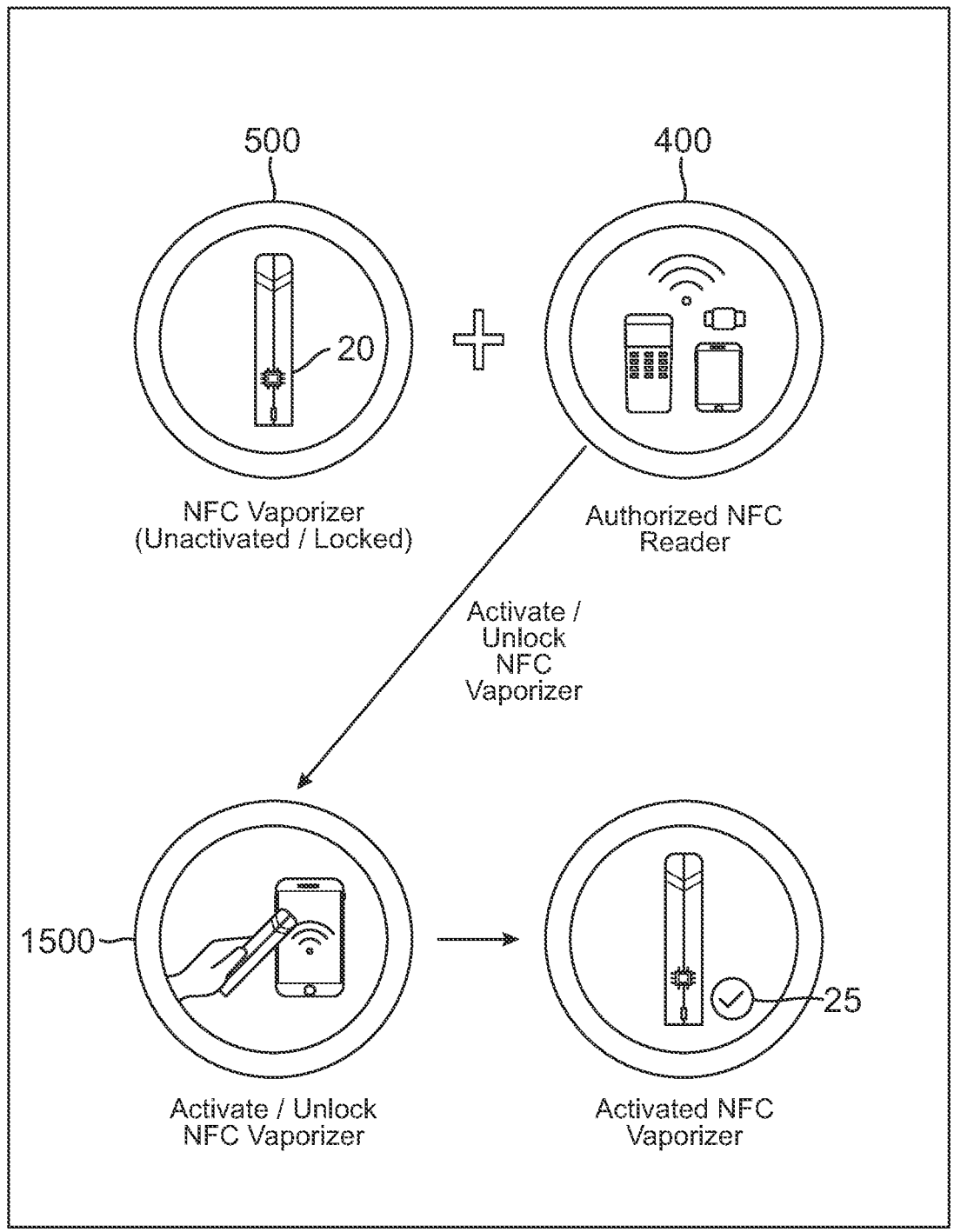
FIG. 15 is a schematic structural diagram of an activation procedure using a near field communication authentication device.

In FIG. 15, a schematic flow chart 1500 is provided demonstrating an activation procedure 1500 for a near field communication electronic cigarette 500. In this embodiment of the present invention, the near field communication electronic cigarette 500 goes from deactivated 20 to activated 25 through authentication by an authorized near field communication reader mobile terminal 400, which can be any device with functionality of near field communication readability. Some non-limiting examples include a cell phone, smartwatch, tablet, handheld scanner, key fob, computer, and the like. This near field communication reader 400 can be configured to have authorization to authenticate an electronic cigarette 500, or consumable content 60 for use in the electronic cigarette 500, for instance a pod/cartridge 65, or even the consumable content 60 itself. This authorization can in one example be programmed onto the near field communication reader 400 as a "master key", wherein it can unlock/activate 25 any electronic cigarette 500 or consumable content 60 by a certain manufacturer. Alternatively, near field communication reader 400 can be authorized only for the activation of a certain batch of consumable content 60, or any selective type or subset of product. This can allow a vendor to quickly change an electronic cigarette 500 from a deactivated state 20 to an activated state 25, while providing safeguards against activation of an electronic cigarette 500 or consumable content 60 by underage users, authentication of stolen product, or any other undesirable result of a "master key" falling into the wrong hands.

The near field communication reader 400 can then activate 25 the product in different manners, with mechanisms suitable for the given embodiment. For instance, in one embodiment, activations defected by a current change in the electronic cigarette 500. In other embodiments there can be a mechanical mechanism blocking the use of the electronic cigarette 500, wherein the mechanical mechanism is moved into an unlocked position 25 upon authentication. For authentication to occur, the electronic cigarette 500 must be in close enough proximity to the near field communication reader 400 to be read.

In one embodiment, the vaporizer 500 can be delivered to a vendor in a locked/deactivated state 20. At checkout, the vendor can then manually verify a prospective user's identification document 30 to ensure they are of sufficient age to use and/or purchase the vaporizer 500. If yes, the near field communication mobile terminal 400 can send an activation signal 1090 to the vaporizer 500 to change its status from locked 20 to unlocked 25. As discussed above, the activation can be carried out by a higher voltage pulse being sent from the NFC chipset to the printed circuit board assembly (PCBA) of the vaporizer 500. The vaporizer 500 can be configured to recognize the magnitude of the voltage pulse, correlate it to an activation signal 1090, and accordingly unlock the vaporizer 500.

Figure 16:
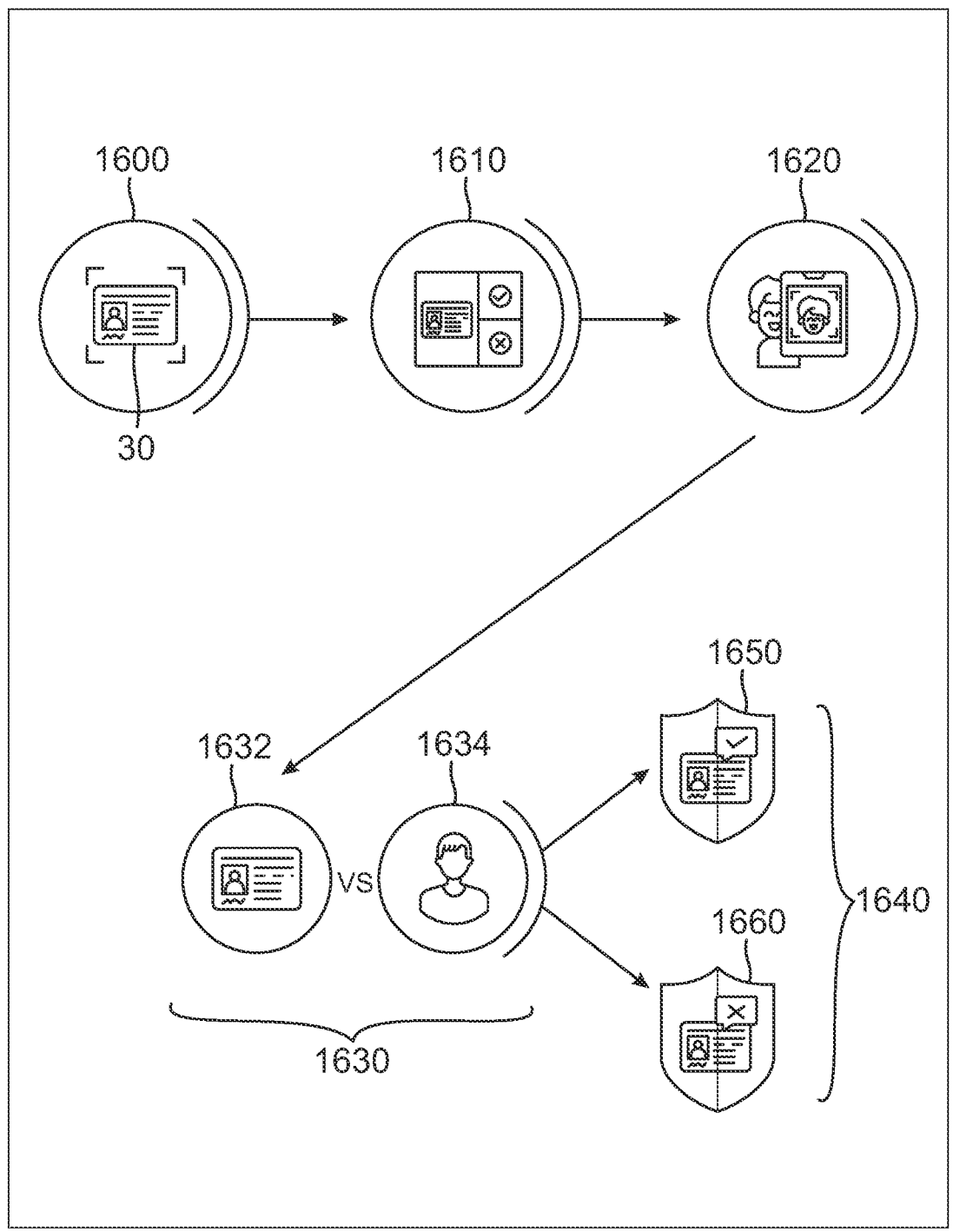
FIG. 16 is a schematic structural diagram of a user age verification procedure using facial recognition and identification documentation.

FIG. 16 shows a schematic flow diagram for age verification of a potential electronic cigarette user by at least one of facial recognition and document identification. According to step 1600, a user may upload an image of an identification document 30. The photograph could be taken using a camera 80 embedded in an application, for instance using a cell phone camera 80. Alternatively, an existing image of the identification document 30 could be uploaded. The identification document 30 can be, for example, a driver's license, a passport, a government issued identification card, or any other document suitable for verifying a user's age. The information corresponding to the age verification document 30 could also be conveyed to the application by other means, for example through a secure database.

In step 1610, the age identification document 30 is then transmitted to a server on a cloud for validation of the user's age and authenticity of the identification document 30. If the server indicates that the user's age is not sufficient to purchase and/or use the product, then the process terminates and the electronic cigarette 500 remains locked 20. Further, if the document 30 is flagged as fake, fraudulent, expired, or otherwise inadequate, the processes will likewise terminate and the electronic cigarette 500 remains locked 20.

If the age identification document 30 is both age-sufficient and valid, the process can proceed to facial recognition according to step 1620. In this step, an application on the mobile terminal 400 can automatically open the camera 80 or prompt the mobile terminal 400 to open a camera 80. The camera 80 can be front or back facing, which can for example depend on whether a vendor or a consumer is verifying. If the vendor is the one verifying, the vendor can utilize the front facing camera 80 to image or scan the consumer with the mobile terminal 400. In contrast, if the consumer is imaging themselves with the mobile terminal 400, a back facing camera 80 can be used. The mobile terminal 400 can also be configured to open the corresponding camera 80 based on a setting of who is performing the verification imaging. The prospective user can then be imaged, for instance as shown in FIG. 13. Subsequently, per step 1630, a server can perform a comparison between an image of the uploaded identification document 30, 1632 and the facial gesture verification data 1634.

This step can also take into account the detected location of the consumer attempting to activate the electronic cigarette 500. This location can be used to correlate the age requirement for purchase or consumption of the consumable contents 60 in the jurisdiction of the detected location.

The electronic cigarette 500 can also be deactivated 20 when it is detected that it has moved from a jurisdiction where the consumable content 60 is no longer legal, either due to the age of the user or otherwise. Furthermore, in an embodiment in which the electronic cigarette 500 is configured to vaporize more than one type of consumable contents 60 with differing regulation, the electronic cigarette 500 can be activated 25 for the use of some but not all types of consumable content 60. For instance, in a jurisdiction where tobacco is legal but marijuana is illegal, the electronic cigarette 500 can activate 25 for tobacco use, but remain locked 20 for a detected marijuana oil or juice.

The age verification procedure concludes by rendering a positive 1650 or negative 1660 result according to step 1640. If there is a positive verification result 1650, the age verification status is saved as a token on the application or on the memory of the electronic cigarette 500 or mobile terminal 400. Alternatively, if there is a negative verification result 1660, a token noting the unsuccessful age verification status can likewise be saved on the application or in the memory of the electronic cigarette 500 or mobile terminal 400.

Additional users may be added as authorized users of the electronic cigarette 500 so as to enable shared use of an electronic cigarette 500 for verified consumers. This prevents cases where one user has an insufficient verification characteristic for certain consumable contents 60 or for a certain jurisdiction from preventing the use of the product by other consumers who are authorized to use the product. The user verification can be repeated for each new pod or cartridge 65 used, or can be saved to streamline the authentication/verification in subsequent uses.

Figure 17:
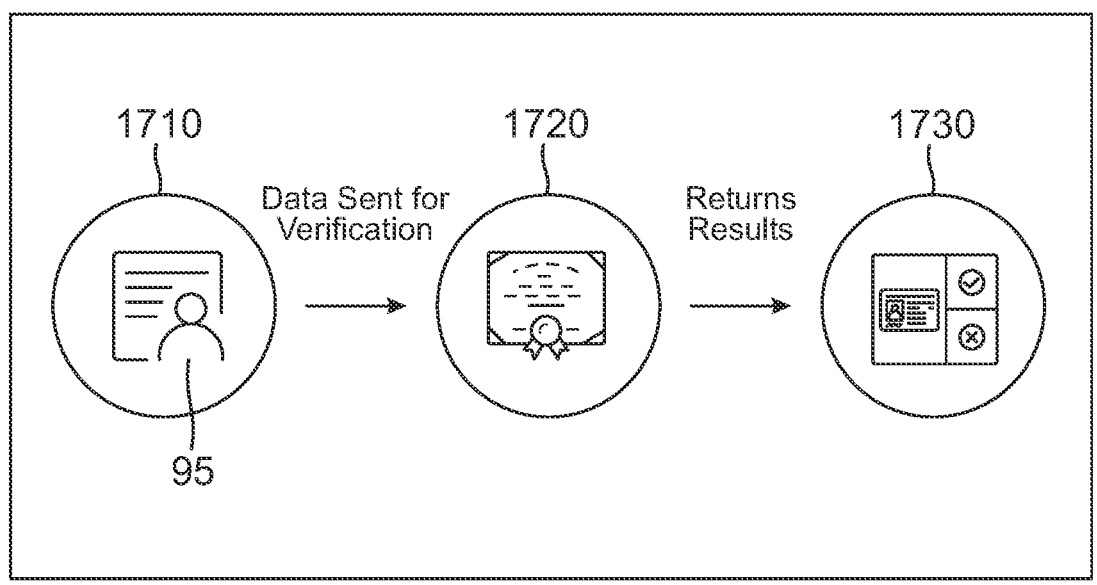
FIG. 17 is a schematic structural diagram for electronic cigarette verification based on a user's physical condition data.

FIG. 17 shows a schematic flow chart of the verification of physical condition for specific vaporization consumable content 60. This procedure begins with step 1710, in which a user submits his or her physical condition data 95 including characteristics such as age, sex, height, weight, or any other physical conditions, along with supporting materials, for instance an identification document 30. This physical condition data 95 can be inputted onto an application on a mobile terminal 400 and transmitted for verification. In step 1720, the physical condition data 95 is evaluated to determine whether the end-user is suitable for consuming the specific vaporizable consumable content 60. In one embodiment the consumable content 60 provider or vendor can be responsible for the verification. In another embodiment, a third-party verification service can be utilized to evaluate the physical condition data 95. In step 1730, a result is returned based on the evaluation executed in step 1720. If verification is successful, the user is approved for consumption of the specific vaporization consumable content 60. This successful physical condition verification result can be saved as a token on the application of the mobile terminal 400. In subsequent uses, the user can then bypass the complete verification procedure to more quickly be able to use the electronic cigarette 500. When a pod/cartridge 65 is consumed and needs replacing, the user can again bypass the verification process, or be subjected to a shorthand verification where the user must simply show they are the same user for which the verification token was created. This can be done in a variety of ways, including access/connection through a mobile application, fingerprint scanning, face recognition, etc. If the verification is unsuccessful, a token will be saved noting the user is not authorized to consume the specific consumable content 60.

Figure 18:
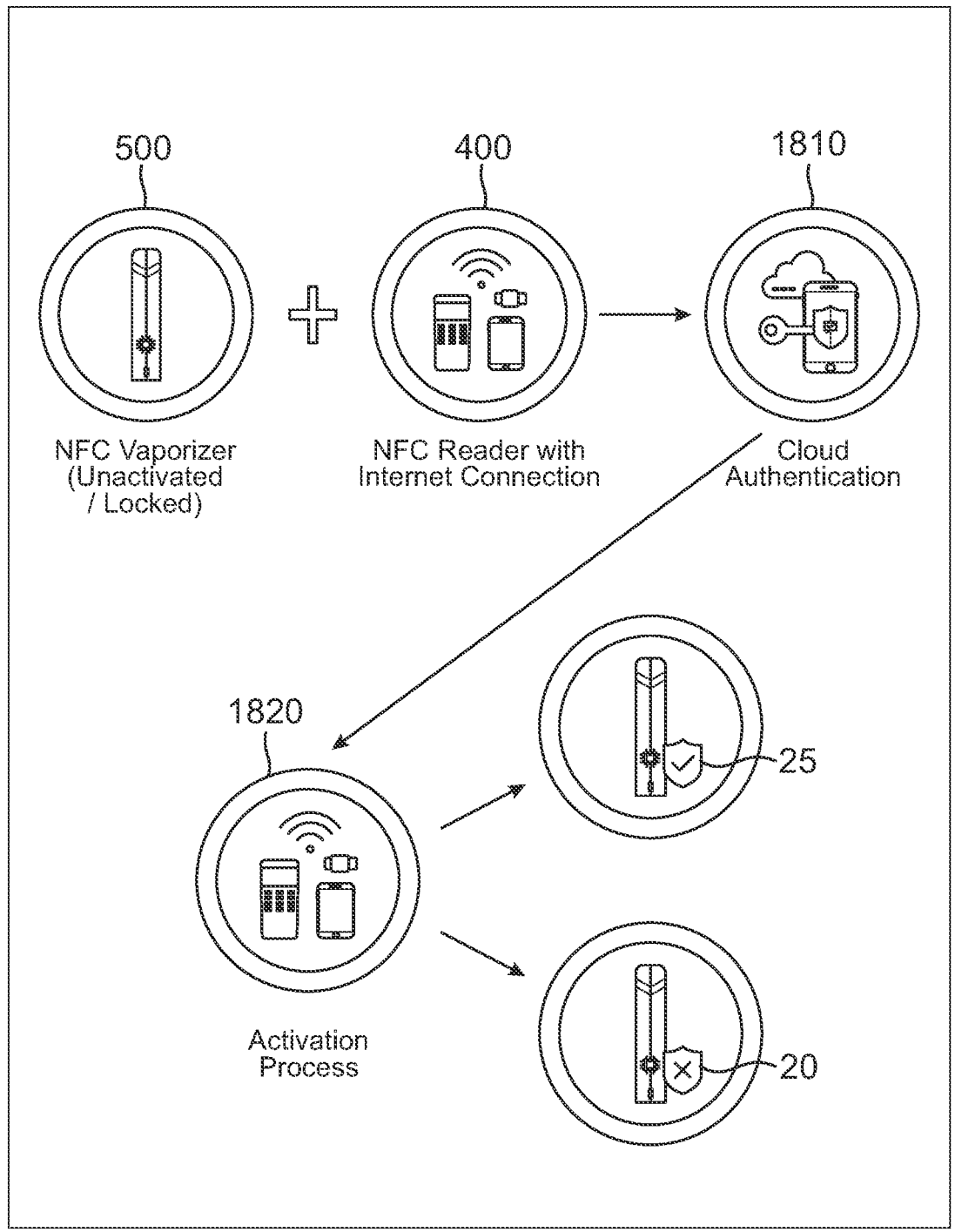
FIG. 18 is a schematic structural diagram showing a cloud authentication process.

FIG. 18 shows a schematic flow chart for an authentication and activation procedure utilizing cloud-based authentication. In this embodiment, an electronic cigarette 500 and mobile terminal 400 with near field communication readability is provided. The electronic cigarette 500 can be mic-activated (i.e. breath activated) or button activated. In step 1810, cloud authentication begins, wherein the unique identification code 525 is read by the mobile terminal 400, and the information corresponding to the unique identification code 525 is accessed from a cloud database on which the information is stored.

The cloud server proceeds to attempt to match the unique identification code 525 to an existing record stored on the cloud. One of three general possible outcomes will result from the matching inquiry. If no match is found, then an invalid product message can be displayed, and the procedure terminates. This would be the case if the product is inauthentic, incompatible, or otherwise unsuitable. The next possible outcome is that a match is found, and the corresponding database record indicates that the electronic cigarette 500 should be in an activated mode 25. This could be the case if, for example, the electronic cigarette 500 had previously been successfully activated. In this event, the electronic cigarette 500 is activated and a user can proceed to use the electronic cigarette 500. The final general possible outcome is when a match is found, and the database record indicates that the electronic cigarette 500 should be in a deactivated/locked mode 20. If this is the case, the activation process of step 1820 can commence.

In the activation process of step 1820, the electronic cigarette 500 can use a random number generator to generate a random number 1050. A first encryption method can be applied thereto in order to generate a first authentication token 1070, which is subsequently transmitted to the service terminal 600 for authentication. The service terminal 600 applies the first encryption method to reverse out the original random number 1050 and then applies a second encryption method to generate a second authentication token 1080. The second authentication token 1080 is transmitted to the electronic cigarette 500, which applies the second encryption method to again reverse out the original random number 1050. If the resulting number following the encryption/decryption procedures is equal to the random number 1050 originally generated by the random number generator of the electronic cigarette 500, the authentication is successfully completed. If successful, according to step 1830, a current change is triggered in the electronic cigarette 500, changing the status from locked mode 20 to unlocked mode 25. A success message can be transmitted to the near field communication reader to inform the cloud server of the status change. Alternatively, if the number resulting from the encryption/decryption procedure does not equal the original random number 1050, the process instead proceeds to step 1840. According to step 1840, electronic cigarette 500 remains in locked mode 20 and sends a failure message to the near field communication reader 400. This failure message can convey to the cloud server the date, time, location, NFC reader information, and user information associated with the unsuccessful authentication attempt.

The embodiments discussed in the specification and shown in the drawings, including the age verification, physical condition verification, cloud server authentication, activation procedures, etc. can be utilized in combination with one another.

Figure 19:
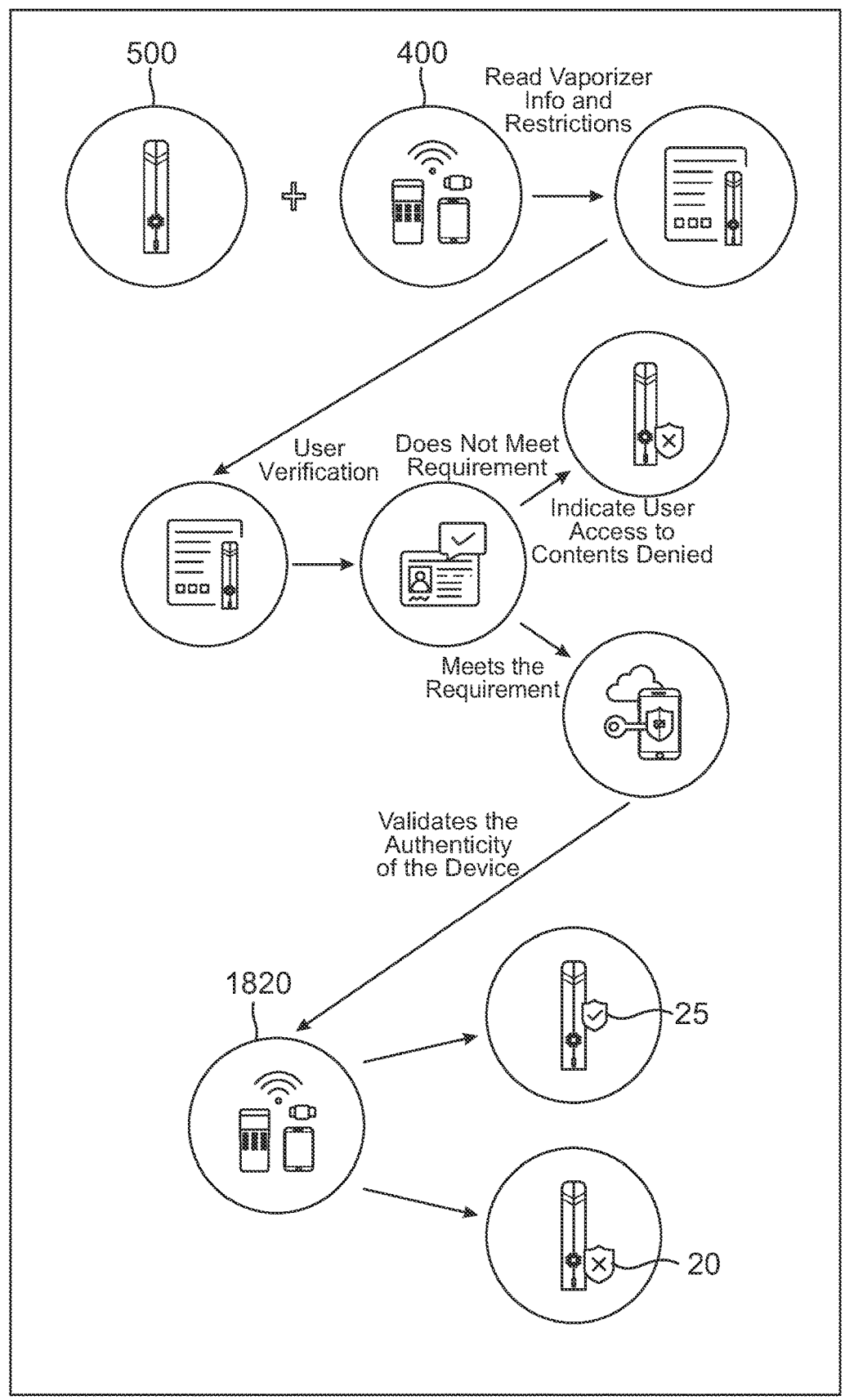
FIG. 19 is a schematic structural diagram showing a comprehensive authentication procedure using age verification and content verification.

FIG. 19 shows a schematic flow chart for cloud-based identification procedure using a mobile terminal 400 comprising an application. This serves as an exemplary procedure showing how the sub-methods can be combined to form a comprehensive verification/authentication/activation procedure. In this embodiment, an electronic cigarette 500 is brought into a readable distance to a near field communication mobile terminal 400. The mobile terminal 400 is provided with Internet connection and an application including user information. As in step 1810 discussed above, the cloud server attempts to match the unique identification code 525 read by the mobile terminal 400 and attempts to match it to a record on the cloud server. If a user has not completed the validation processes in the past, it may be required to apply steps 1600, 1610, 1620, 1630, and 1644 for age verification and/or steps 1710, 1720, and 1734 for physical condition verification before commencing with the activation process. Proceeding under the assumption of completion of age and physical condition verification, the system proceeds to check if the user meets the requirements for use of the specific vaporizable consumable content 60. The user information obtained from the processes of FIG. 16 and FIG. 17 are stored, for example in the application, as tokens. The system 1000 accesses these tokens and evaluate if the user meets the requirements for use. For instance, the system 1000 can compare the verified age of the user to the required age for purchase/consumption of the specific consumable content 60 in the incident jurisdiction. Furthermore, physical condition data 95 of the user, including but not limited to age, sex, height, weight, health condition, or any combination thereof can be additionally evaluated to ensure consumption of the consumable content 60 is acceptable. This can be advantageous for preventing an excessive dosage from being consumed, especially for highly potent consumable contents 60. The unique requirements for activation of specific consumable content 60 can be pre-determined, and the related information 550 can be stored in the label index 515 can be accessed by reading the anti-counterfeiting label 505. If any requirement is not met by the user, the user is notified that access to the vaporizable content 60 is denied. The process then proceeds to step 1820, where the activation process involving encryption methods is applied. Essentially, if the user verification is successful, the method steps of FIG. 18 commence. This culminates in the electronic cigarette 500 being activated 25 or remaining locked 20, depending on whether activation was successful.

LIST OF SYSTEM ELEMENTS BY REFERENCE NUMERAL deactivated/locked configuration 20
activated/unlocked configuration 25
Identification document 30
consumable content 60
pod/cartridge 65
Screen 75
Camera 80
light 85
physical condition data 95
activation procedure 1500
image of the uploaded identification document 1632
facial gesture verification data 1634
positive verification result 1650
negative verification result 1660
External Components
  Electronic cigarette 500
  Mobile terminal 400 (Also called NFC Reader)
  Service terminal 600
Internal Components
  mobile terminal processor 701
  mobile terminal memory 702
  service terminal processor 801
  service terminal memory 802
Label Components
  NFC anti-counterfeiting label 505
  Label index 515
  Label unique identification code 525
  Label information 550
Authentication Components
  system 1000
  key acquisition request 1020
  label key 1030
  authentication request 1040
  random number 1050
  authentication data 1060
  first identity authentication token 1070
  second identity authentication token 1080
  activation signal 1090
Device Module Components
  mobile terminal acquiring module 401
  mobile terminal sending module 402
  mobile terminal generation module 403
  mobile terminal receiving module 404
  mobile terminal trigger module 405
  electronic cigarette sending module 501
  electronic cigarette receiving module 502
  electronic cigarette authentication module 503
  electronic cigarette generation module 504
  service terminal receiving module 601
  service terminal sending module 602
  service terminal verification module 603
  EC label key module 510
  EC label information module 520
  EC token module 530
  MT label key module 410
  Sensor 420
  MT token module 430
  ST label key module 610
  ST authentication data module 620
  ST token module 630
Age Verification Screenshots
  1310, 1320, 1330, 1340
Physical Condition Verification
  1710, 1720, 1730, 1740, 1750

What is claimed is:

1. A system for anti-counterfeit verification of electronic cigarettes, the system comprising:
  an electronic cigarette, comprising:
    an anti-counterfeiting label, comprising:
      a label index, including at least one piece of information about the electronic cigarette; and
      a unique label identification code, corresponding to the electronic cigarette;
    a label information module, comprising a sending module, configured to send anti-counterfeiting label information to a mobile terminal;
    a label key module, comprising a receiving module, an authentication module, and a sending module, configured to:
      receive an authentication request carrying a label key generated by a service terminal;
      authenticate the label key; and
      transmit a random number to the mobile terminal after successful label key authentication;
    a token module, comprising a sending module, a receiving module, and
    a generation module, configured to:
      receive and verify a first identity authentication token; and
      transmit a second identity authentication token to the mobile terminal for verification by the service terminal; and
      generate an activation signal upon successful authentication of the first and second identity authentication tokens;
  the mobile terminal, comprising:
    a sensor, comprising an acquiring module, configured to acquire anti-counterfeiting label information from the anti-counterfeiting label of the electronic cigarette located in an identification range;
    a label key module, comprising a sending module and a receiving module, configured to:
      transmit a key acquisition request carrying the label index and the unique label identification code of the electronic cigarette to the service terminal;
      receive the label key (1030) from the service terminal;
      transmit an authentication request carrying the label key to the electronic cigarette; and
      facilitate transmission of the random number from the electronic cigarette to the service terminal;
    a token module, comprising a generation module, a receiving module, a sending module, and a trigger module configured to:
      generate the first identity authentication token based on authentication data received from the service terminal;
      transmit the first identity authentication token to the electronic cigarette;

facilitate transmission of the second identity authentication token from the electronic cigarette to the service terminal; and trigger the electronic cigarette to generate an activation signal upon successful authentication of the first and the second identity authentication tokens; and the service terminal, comprising:
a label key module, comprising a receiving module and a sending module, configured to:
receive the key acquisition request carrying a label index and a label unique identification code from the mobile terminal; and
transmit a label key based on the key acquisition request to the mobile terminal for authentication by the electronic cigarette;

an authentication data module, comprising a sending module and a receiving module, configured to:
receive the random number from the mobile terminal; and
transmit authentication data to the mobile terminal corresponding to the random number transmitted by the electronic cigarette, wherein the authentication data is used to generate the first identity authentication token; and a token module, comprising a receiving module and a verification module, configured to receive and verify the second identity authentication token sent from the mobile terminal;

wherein the electronic cigarette generates an activation signal upon successful authentication of the first and the second identity authentication tokens.

2. The system for anti-counterfeit verification of electronic cigarettes of claim 1, wherein the mobile terminal and the electronic cigarette are communicatively connected by near field communication.

3. The system of claim 1, wherein the sensor is further configured to obtain data for facial recognition.

4. The system of claim 1, further comprising a multi-colored changing light source, wherein the light source changes color corresponding to prompts for different facial gestures.

5. The system of claim 1, wherein the label index includes at least one of: manufacturing location, manufacturing company, and consumable content.

6. A method of authenticating an electronic cigarette, the method comprising:
a mobile terminal acquiring anti-counterfeiting label information of an electronic cigarette located in an identification range, the anti-counterfeiting label information comprising a label index and a label unique identification code;
the mobile terminal sending a key acquisition request carrying the label index and the label unique identification code to a service terminal;
the service terminal sending a label key according to the label index and the label unique identification code to the mobile terminal;
the mobile terminal sending an authentication request carrying the label key to the electronic cigarette;
the electronic cigarette authenticating the label key and transmitting a random number to the mobile terminal after successful authentication;
the mobile terminal sending the random number to the service terminal;

the service terminal sending authentication data according to the random number to the mobile terminal;

the mobile terminal generating a first identity authentication token according to the authentication data, for verification by the electronic cigarette;

the electronic cigarette sending a second identity authentication token to the service terminal via the mobile terminal, for verification by the service terminal; and the electronic cigarette generating an activation signal upon successful authentication of the first and second identity authentication tokens.

7. The method of claim 6, wherein before the acquiring of the anti-counterfeiting label information of the electronic cigarette, the method further comprises:
acquiring face data and identity information of a user;
recognizing age of the user according to the face data and identity information and obtaining an age recognition result;
generating and displaying an activation prompt upon satisfactory age recognition results; and
after the user inputs an activation confirmation instruction for the activation prompt, commencing detection of the electronic cigarette located within a recognition range.

8. The method of claim 6, further comprising connecting the mobile terminal and the electronic cigarette communicatively by near field communication.

9. An electronic cigarette, comprising:
a sending module, configured to send anti-counterfeiting label information comprising a label index and a label unique identification code to a mobile terminal when the mobile terminal is located within a sensing detection range, wherein the anti-counterfeiting label information is bundled with a key acquisition request by the mobile terminal to obtain a label key according to the label index and the label unique identification code from a service terminal;

a receiving module, configured to receive an authentication request carrying the label key from the mobile terminal;

an authentication module, configured to authenticate the label key and transmit a random number to the service terminal via the mobile terminal upon successful authentication, wherein the random number is used to obtain corresponding authentication data from the service terminal;

wherein the receiving module is further configured to receive and verify a first identity authentication token sent by the mobile terminal, and wherein the sending module is further configured to send a second identity authentication token to the service terminal via the mobile terminal for verification; and a generation module, configured to generate an activation signal upon successful authentications of the first and second identity authentication tokens.

10. The electronic cigarette of claim 9, further configured to be communicatively connectable by near field communication with the mobile terminal.

11. The electronic cigarette of claim 9, wherein a master key can be used to activate a given set of cartridges.

* * * * *